United States Patent
Cho et al.

(10) Patent No.: US 12,126,686 B2
(45) Date of Patent: Oct. 22, 2024

(54) ELECTRONIC DEVICE FOR CONTROLLING INTERNET OF THINGS DEVICE AND METHOD OF OPERATING THE SAME

(71) Applicant: SAMSUNG ELECTRONICS CO., LTD., Suwon-si (KR)

(72) Inventors: Sanghoon Cho, Suwon-si (KR); Namjin Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/169,887

(22) Filed: Feb. 16, 2023

(65) Prior Publication Data

US 2023/0362259 A1    Nov. 9, 2023

Related U.S. Application Data

(63) Continuation of application No. PCT/KR2023/001573, filed on Feb. 3, 2023.

(30) Foreign Application Priority Data

May 9, 2022    (KR) .................. 10-2022-0056456

(51) Int. Cl.
*H04L 67/141*    (2022.01)
*H04L 9/40*    (2022.01)
*H04L 67/50*    (2022.01)

(52) U.S. Cl.
CPC ........ *H04L 67/141* (2013.01); *H04L 63/0846* (2013.01); *H04L 67/50* (2022.05)

(58) Field of Classification Search
CPC .... H04L 67/141; H04L 67/50; H04L 63/0846
See application file for complete search history.

(56) References Cited

U.S. PATENT DOCUMENTS 11,405,375 B2 *  8/2022  VanBlon ............... H04L 9/3239
11,637,834 B2 *  4/2023  Meredith .............. H04L 9/3268
                                                               726/6

(Continued)

FOREIGN PATENT DOCUMENTS

CN    113711631 B    4/2024
KR    20140100374 A    8/2014

(Continued)

OTHER PUBLICATIONS

Nicholas K. Clark, "Securely & Efficiently Integrating Constrained Devices into an ICN-IoT," 2021 IEEE 7th World Forum on Internet of Things, Nov. 9, 2021, pp. 536-541.

(Continued)

*Primary Examiner* — Azizul Choudhury
(74) *Attorney, Agent, or Firm* — CANTOR COLBURN LLP

(57) ABSTRACT

An electronic device includes a communication circuit and a processor, The processor is configured to obtain a connection code related to an external electronic device through the communication circuit, discover the external electronic device through the communication circuit based on the connection code, establish a first secure channel with the external electronic device, based on the connection code, through the communication circuit, and transmit a control command for an internet-of-things (IoT) device to perform a designated action to the external electronic device through the first secure channel using the connection code.

17 Claims, 14 Drawing Sheets

(56) References Cited

U.S. PATENT DOCUMENTS

| | | | |
|---|---|---|---|
| 2016/0349127 A1* | 12/2016 | Britt | H04W 4/06 |
| 2016/0366148 A1 | 12/2016 | Ariel et al. | |
| 2016/0366157 A1* | 12/2016 | Smith | H04L 63/06 |
| 2017/0041316 A1 | 2/2017 | Setchell et al. | |
| 2018/0054423 A1* | 2/2018 | Liu | H04L 63/061 |
| 2018/0084424 A1 | 3/2018 | Sonasath et al. | |
| 2018/0176079 A1 | 6/2018 | Teo et al. | |
| 2018/0337799 A1* | 11/2018 | Levi | G10L 15/30 |
| 2019/0349762 A1 | 11/2019 | Bang | |
| 2021/0165701 A1 | 6/2021 | Fujino et al. | |
| 2021/0185530 A1* | 6/2021 | Rehn | H04W 12/041 |
| 2022/0408247 A1* | 12/2022 | Huang | H04W 12/041 |

FOREIGN PATENT DOCUMENTS

| | | |
|---|---|---|
| KR | 101688813 B1 | 12/2016 |
| KR | 1020170055264 A | 5/2017 |
| KR | 20170089204 A | 8/2017 |
| KR | 1020190143533 A | 12/2019 |
| KR | 20200068068 A | 6/2020 |
| KR | 102236656 B1 | 4/2021 |
| WO | 2020221456 A1 | 11/2020 |

OTHER PUBLICATIONS

International Search Report mailed May 1, 2023 for PCT/KR2023/001573.

* cited by examiner

ELECTRONIC DEVICE FOR CONTROLLING INTERNET OF THINGS DEVICE AND METHOD OF OPERATING THE SAME

CROSS-REFERENCE TO RELATED APPLICATIONS

This application is a continuation of International Application No. PCT/KR2023/001573 designating the United States, filed on Feb. 3, 2023, in the Korean Intellectual Property Receiving Office and claiming priority to Korean Patent Application No. 10-2022-0056456, filed on May 9, 2022, in the Korean Intellectual Property Office, the disclosures of all of which are incorporated by reference herein in their entireties.

BACKGROUND

1. Field

The disclosure relates to an electronic device for controlling an internet-of-things (IoT) device and an operation method thereof.

2. Description of the Related Art

Various services and additional functions provided through user terminals, for example, electronic devices such as smartphones, are gradually increasing. In order to increase the utility value of these electronic devices and satisfy the needs of various users, communication service providers or electronic device manufacturers are competitively developing electronic devices that provide various functions. Accordingly, various functions provided through electronic devices are being gradually upgraded.

As wireless communication technology develops, devices using artificial intelligence (AI) are being widely introduced. For example, home appliances that are applied with internet-of-things (IoT) technology and connected to a network may use artificial intelligence. IoT technology may provide intelligent Internet technology services that create new values in human life by collecting and analyzing data produced by devices. IoT technology may be applied to fields such as smart homes, smart buildings, smart cities, smart cars, and smart appliances through convergence and combination of existing Internet technologies and various industries.

Meanwhile, a home is equipped with a variety of home appliances for the user's convenience. Various services are being proposed to more conveniently operate or control home appliances using IoT technology. Home network technology may provide various services to users at home through a home network. For example, a user may control various IoT devices (e.g., home appliances to which IoT technology is applied) constituting a home network using a personal electronic device (e.g., a smartphone). Users may wish to receive more diverse services to control IoT devices. Accordingly, various technologies are desired to be developed to control IoT devices by reflecting a user's intention.

SUMMARY

A user may perform an onboarding procedure for registering an electronic device (e.g., a smartphone or a wearable device) owned by the user on a network to which IoT devices belong in order to control the IoT devices. When temporary device control is desired, the user may onboard the electronic device to the network, control IoT devices using the electronic device, and release the electronic device from the network. Alternatively, after registering his or her account on the network, the user may receive control authority over the account through an invitation procedure from an electronic device pre-registered on the network.

As IoT devices are widely used, IoT devices that may be shared by multiple users may increase in addition to personally owned IoT devices. A guest visiting a friend's house or staying at a hotel may wish to control IoT devices installed in the friend's house or hotel temporarily or for a predetermined period of time.

When temporary control authority over IoT devices is requested as described above, technologies for temporarily granting control authority over IoT devices in the network to the electronic device without onboarding of the electronic device possessed by the user to the network may be desired.

Various embodiments of the disclosure relate to an electronic device capable of obtaining temporary control authority over IoT devices in a business-to-customer (B2C) scenario such as a home network or a business-to-business (B2B) scenario such as hoteling and an operation method thereof.

According to various embodiments of the disclosure, an electronic device may easily obtain control authority over controlled devices provided in a predetermined environment or space, e.g., a hotel.

According to various embodiments of the disclosure, an electronic device may obtain information for accessing controlled devices using a connection code provided at a visited place.

The technical problems to be solved in the disclosure is not limited to the technical problems mentioned above, and other technical problems not mentioned may be clearly understood by those skilled in the art from the description below.

An electronic device according to various embodiments includes: a communication circuit; and at least one processor. The at least one processor is configured to obtain a connection code related to an external electronic device through the communication circuit. The at least one processor is configured to discover the external electronic device, based on the connection code, through the communication circuit. The at least one processor is configured to establish a first secure channel with the hub device, based on the connection code, through the communication circuit. The at least one processor is configured to transmit a control command for at least one internet-of-things (IoT) device to perform a designated action to the external electronic device through the first secure channel using the connection code.

A method of operating an electronic device according to various embodiments includes obtaining a connection code related to a hub device. The method includes discovering the hub device based on the connection code. The method includes establishing a first secure channel with the hub device based on the connection code. The method includes transmitting a control command for an internet-of-things (IoT) device to perform a designated action to the hub device through the first secure channel using the connection code.

According to various embodiments, a non-transitory computer readable storage medium storing one or more programs, the one or more programs comprising instructions configured to, when executed by at least one processor of an electronic device, cause the electronic device to: obtain a connection code related to an external electronic device, discover the external electronic device, based on the connection code, establish a first secure channel with the hub device, based on the connection code, and transmit a control command for an internet-of-things (IoT) device to perform a designated action to the external electronic device through the first secure channel using the connection code.

DETAILED DESCRIPTION

Figure 1:
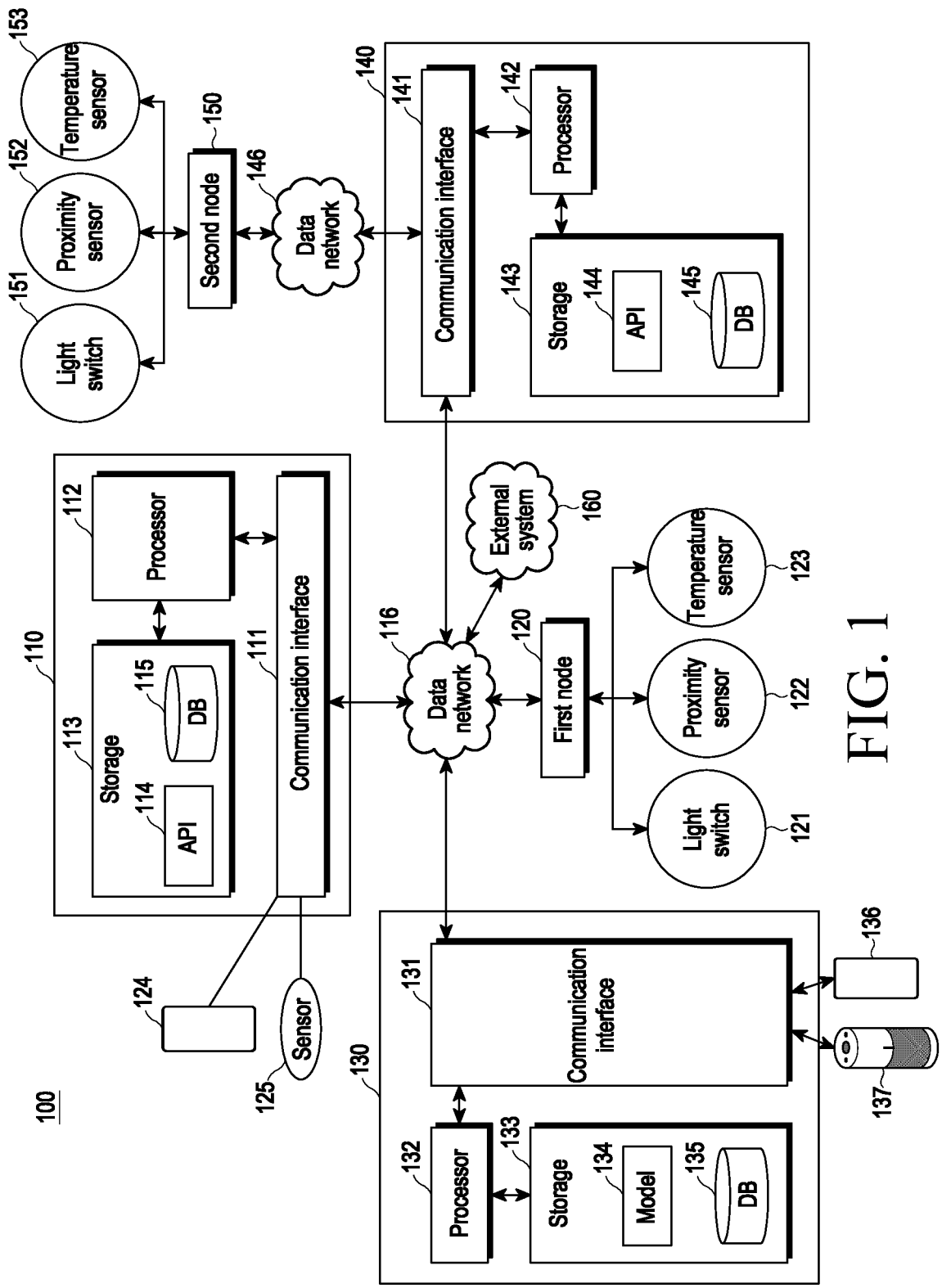
FIG. 1 illustrates an internet-of-things (IoT) system according to various embodiments.

FIG. 1 illustrates an IoT (internet of things) system 100 according to various embodiments. In such embodiments, at least one selected from the elements shown in FIG. 1 may be omitted, and elements not shown in the drawing may be further included.

Referring to FIG. 1, an IoT system 100 according to an embodiment may include a plurality of electronic devices capable of being connected to the data network 116 or 146. For example, the IoT system 100 may include at least one of a first IoT server 110, a first node 120, a voice assistant server 130, a second IoT server 140, a second node 150, or devices 121, 122, 123, 124, 125, 136, 137, 151, 152, and 153.

According to an embodiment, the first IoT server 110 may include at least one of a communication interface 111, a processor 112, or a storage 113. The second IoT server 140 may include at least one of a communication interface 141, a processor 142, or a storage 143. The "IoT server" in this disclosure may remotely control and/or monitor one or more devices (e.g., the device 121, 122, 123, 124, 125, 151, 152, and 153) through a relay device (e.g., the first node 120 or the second node 150) or directly without the relay device, based on, for example, a data network (e.g., a data network 116 or a data network 146). The "device" herein may be a sensor, an appliance, an office electronic device, or a device for performing processes disposed (or located) in a local environment, such as, home, offices, factories, buildings, external places, or other types of premises, and the type thereof is not limited. A device that receives a control command and performs an operation corresponding to the control command may be referred to as a "target device". The IoT server may be referred to as a central server as the IOT server may select a target device from among a plurality of devices and provide a control command.

According to an embodiment, the first IoT server 110 may perform communication with the devices 121, 122, and 123 through the data network 116. The data network 116 may indicate a network for long-range communication, such as the Internet or a computer network (e.g., LAN or WAN), or may include a cellular network.

According to an embodiment, the first IoT server 110 may be connected to the data network 116 through the communication interface 111. The communication interface 111 may include a communication device (or a communication module) for supporting communication in the data network 116, and may be integrated into one element (e.g., a single chip) or implemented as a plurality of separate elements (e.g., a plurality of chips). The first IoT server 110 may perform communication with the devices 121, 122, and 123 through the first node 120. The first node 120 may receive data from the first IoT server 110 through the data network 116 and transmit the received data to at least one selected from the devices 121, 122, and 123. Alternatively, the first node 120 may receive data from at least one selected from the devices 121, 122, and 123 and transmit the received data to the first IoT server 110 through the data network 116. The first node 120 may function as a bridge between the data network 116 and the devices 121, 122, and 123. Although FIG. 1 shows an embodiment where the first node 120 is a single node, this is only an example, and the number of nodes is not limited.

The "node" in this disclosure may be an edge computing system or may be a hub device. According to an embodiment, the first node 120 may support wired and/or wireless communication of the data network 116 and also support wired and/or wireless communication with the devices 121, 122, and 123. For example, the first node 120 may be connected to the devices 121, 122, and 123 through short-range communication network such as Bluetooth, Wi-Fi, Wi-Fi direct, Z-wave, Zig-bee, INSETEON, X10, or infrared data association (IrDA), but the type of communication is not limited. The first node 120 may be disposed (or located) in the environment such as home, offices, factories, buildings, external places, or other types of premises. Accordingly, the devices 121, 122, and 123 may be monitored and/or controlled by a service provided from the first IoT server 110, and the devices 121, 122, and 123 may not be desired to be equipped with the capability of complete network communication (e.g., Internet communication) for direct connection to the first IoT server 110. Although FIG. 1 shows an embodiment where the devices 121, 122, and 123 are implemented as electronic devices within a home environment, such as a light switch, a proximity sensor, a temperature sensor, and the like, this is only an example, and the devices are not limited thereto.

According to an embodiment, the first IoT server 110 may support direct communication with the devices 124 and 125. Herein, "direct communication" may be, for example, communication that does not go through a relay device such as the first node 120 and may indicate communication through, for example, a cellular communication network and/or a data network.

According to an embodiment, the first IoT server 110 may transmit control commands to at least one selected from the devices 121, 122, 123, 124, and 125. Herein, the "control command" may denote data that causes a controllable device to perform a specific operation, and the specific operation may be an operation performed by the device, including outputting information, sensing information, reporting information, and managing (e.g., deleting or producing) information, and is not limited to a specific type. For example, the processor 112 may obtain information (or a request) for producing control command from an outside (e.g., the voice assistant server 130, the second IoT server 140, the external system 160, or at least one selected from the devices 121, 122, 123, 124, and 125) and produce control command, based on the obtained information. Alternatively, the processor 112 may produce control command, based on monitoring results of at least one selected from the devices 121, 122, 123, 124, and 125 satisfying designated conditions. The processor 112 may control the communication interface 111 to transmit the control command to the target device.

According to an embodiment, the processor 112, the processor 132, or the processor 142 may be implemented as a combination of one or more of a general-purpose processor such as a central processing unit (CPU), a digital signal processor (DSP), an application processor (AP), a communication processor (CP), or the like, a graphic-dedicated processor such as a graphical processing unit (GPU) or a vision processing unit (VPU), or an artificial intelligence-dedicated processor such as a neural processing unit (NPU). The above-described processing units are only examples, and those skilled in the art would understand that the processor 112 is not limited as long as it is an arithmetic means capable of executing instructions stored in the memory 113 and outputting executed results.

According to an embodiment, the processor 112 may configure a web-based interface based on an API 114 or expose resources managed by the first IoT server 110 to the outside. The web-based interface may support, for example, communication between the first IoT server 110 and an external web service. For example, the processor 112 may allow the external system 160 to control and/or access the devices 121, 122, and 123. The external system 160 may be, for example, an independent system that is not related to the system 100 or is not a part thereof. The external system 160 may be, for example, an external server or a web site. However, security may be desired for the external system 160 to access the devices 121, 122, and 123 or the resources of the first IoT server 110. According to an embodiment, the processor 112 may expose an API endpoint (e.g., a universal resource locator (URL)) based on the API 114 to the outside for an automation application. According to an embodiment, as described above, the first IoT server 110 may transmit a control command to a target device among the devices 121, 122, and 123. In such an embodiment, the features of the communication interface 141, the processor 142, the API 144 of the storage 143, and the database 145 of the second IoT server 140 may be substantially the same as the features of the communication interface 111, the processor 112, the API 114 of the storage 113, and the database 115 of the first IoT server 110. In addition, the features of the second node 150 may be substantially the same as the features for the first node 120. The second IoT server 140 may transmit a control command to a target device among the devices 151, 152, and 153. The first IoT server 110 and the second IoT server 140 may be operated by the same service provider in an embodiment but may be operated by different service providers, respectively, in another embodiment.

According to an embodiment, the voice assistant server 130 may transmit and receive data to and from the first IoT server 110 through the data network 116. The voice assistant server 130 according to an embodiment may include at least one of a communication interface 131, a processor 132, or a storage 133. The communication interface 131 may perform communication with a smartphone 136 or an AI speaker 137 through a data network (not shown) and/or a cellular network (not shown). The smartphone 136 or the AI speaker 137 may include a microphone and may obtain a user voice to convert the same to a voice signal and transmit the voice signal to the voice assistant server 130. The processor 132 may receive a voice signal from the smartphone 136 or the AI speaker 137 through the communication interface 131. The processor 132 may process the received voice signal, based on a stored model 134. The processor 132 may produce (or identify) a control command, based on information stored in the database 135, using the processed result. According to an embodiment, the storage 113, 133, or 143 may include a non-transitory storage medium of at least one of a flash memory type, a hard disk type, a multimedia card micro type, card type memory (e.g., an SD or XD memory, etc.), random access memory (RAM), static random access memory (SRAM), read-only memory (ROM), electrically erasable programmable read-only memory (EEPROM), programmable read-only memory (PROM), magnetic memory, a magnetic disk, and an optical disk, and the type thereof is not limited.

In various embodiments, at least one device (e.g., the device 124) communicating with the first IoT server 110 may be a smartphone (e.g., the electronic device 201 in FIG. 2) in the network environment.

Figure 2:
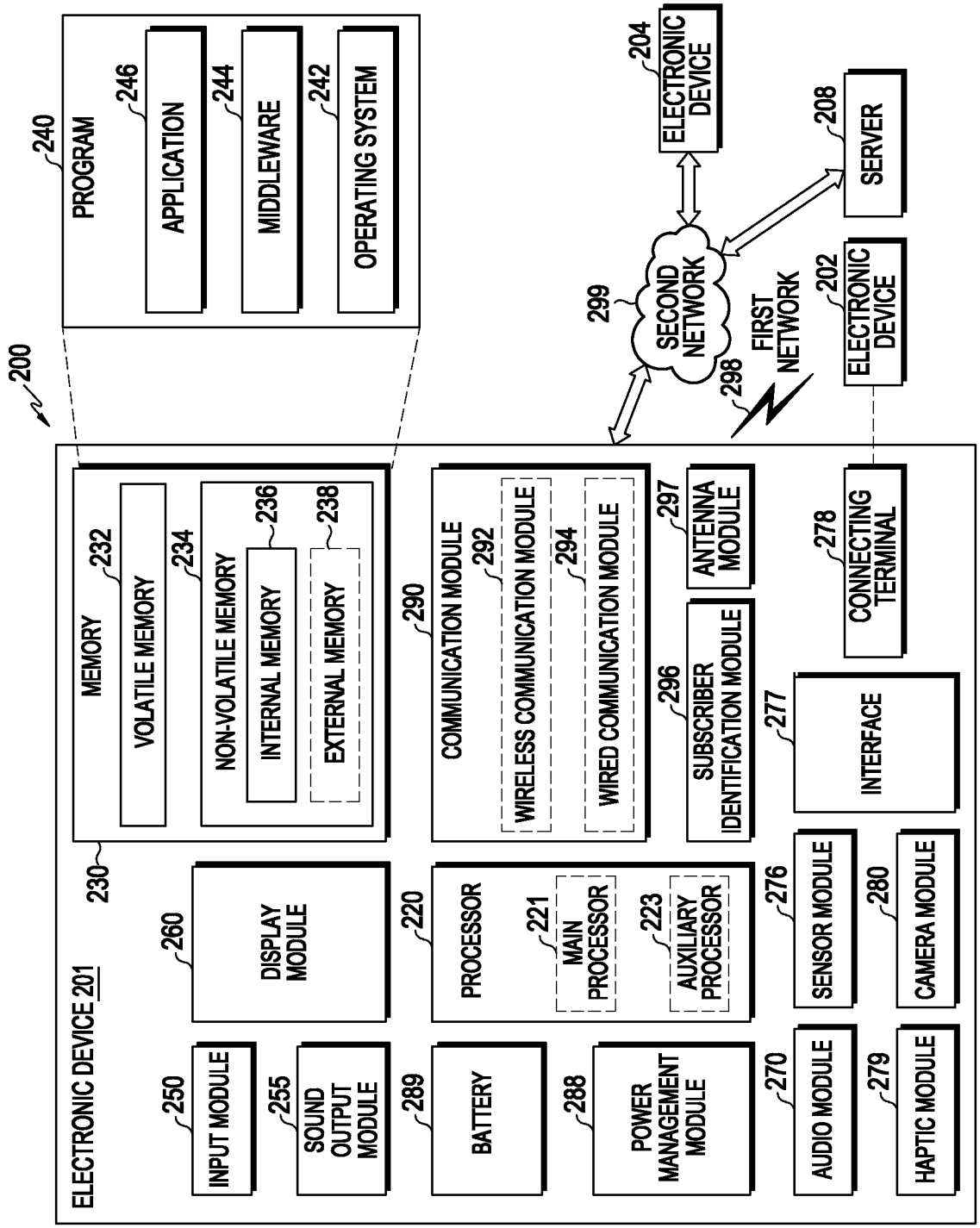
FIG. 2 is a block diagram of an electronic device in a network environment according to various embodiments.

FIG. 2 is a block diagram illustrating an electronic device 201 in a network environment 200 according to various embodiments.

Referring to FIG. 2, the electronic device 201 in the network environment 200 may communicate with an electronic device 202 via a first network 298 (e.g., a short-range wireless communication network), or at least one of an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input module 250, a sound output module 255, a display module 260, an audio module 270, a sensor module 276, an interface 277, a connecting terminal 278, a haptic module 279, a camera module 280, a power management module 288, a battery 289, a communication module (or a communication circuit) 290, a subscriber identification module (SIM) 296, or an antenna module 297. In some embodiments, at least one of the components (e.g., the connecting terminal 278) may be omitted from the electronic device 201, or one or more other components may be added in the electronic device 201. In some embodiments, some of the components (e.g., the sensor module 276, the camera module 280, or the antenna module 297) may be implemented as a single component (e.g., the display module 260).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may store a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 221. For example, when the electronic device 201 includes the main processor 221 and the auxiliary processor 223, the auxiliary processor 223 may be adapted to consume less power than the main processor 221, or to be specific to a specified function. The auxiliary processor 223 may be implemented as separate from, or as part of the main processor 221.

The auxiliary processor 223 may control, for example, at least some of functions or states related to at least one component (e.g., the display module 260, the sensor module 276, or the communication module 290) among the components of the electronic device 201, instead of the main processor 221 while the main processor 221 is in an inactive (e.g., sleep) state, or together with the main processor 221 while the main processor 221 is in an active (e.g., executing an application) state. According to an embodiment, the auxiliary processor 223 (e.g., an image signal processor or a communication processor) may be implemented as part of another component (e.g., the camera module 280 or the communication module 290) functionally related to the auxiliary processor 223. According to an embodiment, the auxiliary processor 223 (e.g., the neural processing unit) may include a hardware structure specified for artificial intelligence model processing. An artificial intelligence model may be generated by machine learning. Such learning may be performed, e.g., by the electronic device 201 where the artificial intelligence model is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, a key (e.g., a button), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 260 may visually provide information to the outside (e.g., a user) of the electronic device 201. The display module 260 may include, for example, a display, a hologram device, or a projector and control circuitry to control a corresponding one of the display, hologram device, and projector. According to an embodiment, the display module 260 may include a touch sensor adapted to detect a touch, or a pressure sensor adapted to measure the intensity of force incurred by the touch.

The audio module 270 may convert a sound into an electrical signal and vice versa. According to an embodiment, the audio module 270 may obtain the sound via the input module 250, or output the sound via the sound output module 255 or an external electronic device (e.g., an electronic device 202 (e.g., a speaker or a headphone)) directly or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, an HDMI connector, a USB connector, an SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device 204 via the first network 298 (e.g., a short-range communication network, such as Bluetooth™, wireless-fidelity (Wi-Fi) direct, or infrared data association (IrDA)) or the second network 299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify or authenticate the electronic device 201 in a communication network, such as the first network 298 or the second network 299, using subscriber information (e.g., international mobile subscriber identity (IMSI)) stored in the subscriber identification module 296.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the electronic device 204), or a network system (e.g., the second network 299). According to an embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device) of the electronic device 201. According to an embodiment, the antenna module 297 may include an antenna including a radiating element composed of a conductive material or a conductive pattern formed in or on a substrate (e.g., a printed circuit board (PCB)). According to an embodiment, the antenna module 297 may include a plurality of antennas (e.g., array antennas). In such a case, at least one antenna appropriate for a communication scheme used in the communication network, such as the first network 298 or the second network 299, may be selected, for example, by the communication module 290 from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

According to various embodiments, the antenna module 297 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the external electronic devices 202 or 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In another embodiment, the external electronic device 204 may include an internet-of-things (IoT) device. The server 208 may be an intelligent server using machine learning and/or a neural network. According to an embodiment, the external electronic device 204 or the server 208 may be included in the second network 299. The electronic device 201 may be applied to intelligent services (e.g., smart home, smart city, smart car, or healthcare) based on 5G communication technology or IoT-related technology.

In various embodiments, the IoT system 100 may include an external electronic device (e.g., the hub device 302 in FIG. 3) (for example, the first IoT server 110 or the second IoT server 140). The external electronic device (e.g., the hub device) may communicate with the electronic devices (e.g., the electronic device 124) directly or through a data network (e.g., the data network 116 or 146) and transmit control commands to the IoT devices (e.g., the target devices 121, 122, 124, 125, 151, 152, and 153).

Figure 3:
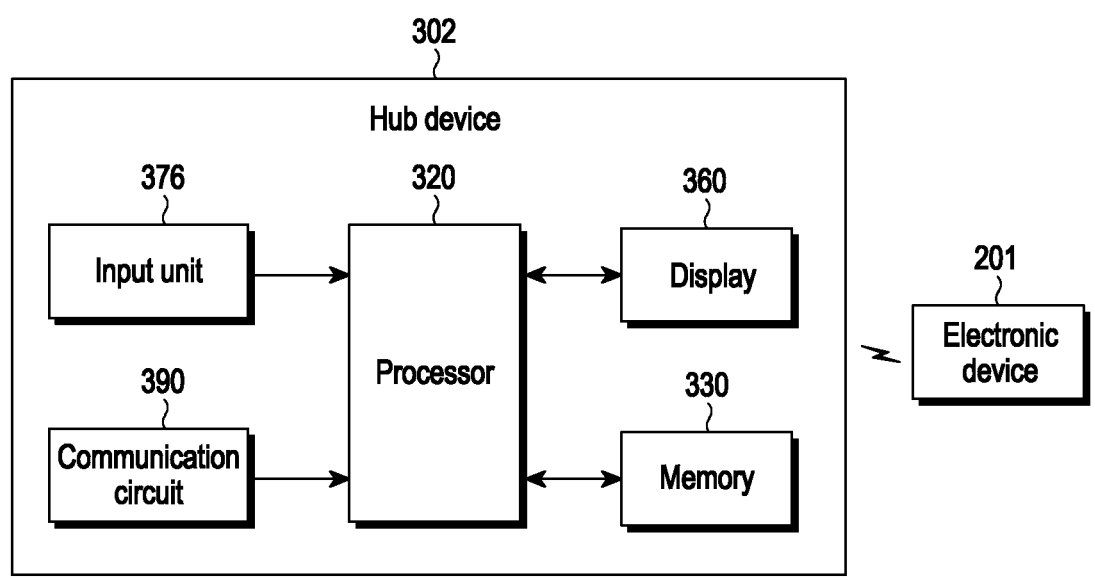
FIG. 3 is a block diagram illustrating a hub device according to various embodiments.

FIG. 3 is a block diagram illustrating a hub device 302 according to various embodiments.

Referring to FIG. 3, an embodiment of the hub device 302 may include a processor 320, a memory 330, a display 360, an input unit 376, and a communication circuit 390. In an embodiment, the input unit 376 may operate in a similar manner as the input module 250 described above with reference to FIG. 2 and receive commands or data to be used for the elements (e.g., the processor 320) of the hub device 302 from the outside (e.g., a user) of the hub device 302. The input unit 376 may include, for example, a microphone, a mouse, a keyboard, keys (e.g., buttons), or a digital input means.

According to various embodiments, the memory 330 may store information, data and the parameters used for operation of the hub device 302 and sensor data. In an embodiment, the memory 330 may store user information related to (or corresponding to) a user device (e.g., the electronic device 201) or control information related to IoT devices (e.g., the target devices 121, 122, 124, 125, 151, 152, and 153) under the control of the processor 320.

According to various embodiments, the processor 320 may produce report information, based on data obtained from the IoT devices through the communication circuit 390 upon communication connection with the electronic device 201. In an embodiment, the report information may include execution results of the control commands in the IoT devices and/or sensor data collected from the IoT devices or include operation states of the IoT devices or a state of the user obtained by analyzing the execution results and/or sensor data. The processor 320 may store the report information in the memory 330 and/or transmit the report information to the electronic device 201 or other devices (e.g., a server) through the communication circuit 390.

In an embodiment, in response to a connection request from the electronic device 201, the processor 320 may connect with the electronic device 201 using the communication circuit 390 and establish at least one secure channel through the connection. Through at least one secure channel, the processor 320 may authenticate connection with the electronic device 201, receive a control command related to at least one IoT device, and transmit an execution result of the control command to the electronic device 201.

According to various embodiments, the display 360 may display information related to the operation of the hub device 302 under the control of the processor 320. According to an embodiment, the display 360 may display execution results and/or sensor data from the IoT devices and state information (e.g., the operation states of the IoT devices or the state of the user) analyzed by the processor 320.

According to various embodiments, the display 360 may support an input/output function of data and include a touch sensor for detecting a touch. In an embodiment, the display 360 may display a notification for control of the IoT devices under the control of the processor 320. In an embodiment, the processor 320 may receive a notification from the IoT server 110 directly from the IoT server (e.g., the first IoT server 110) or through the electronic device 201 and control the display 360 to display the notification. In an embodiment, the display 360 may display results of performing control commands in the IoT devices under the control of the processor 320. In an embodiment, the processor 320 may transmit a control command to the IoT device and receive a result of executing the control command from the IoT device, thereby controlling the display 360 to display information indicating the result.

According to various embodiments, the communication circuit 390 may communicate with the electronic device 201 under the control of the processor 320. According to an embodiment, the communication circuit 390 may perform communication using at least one of communication schemes including Zigbee, Z-Wave, Wi-Fi, Bluetooth (e.g., Bluetooth legacy or Bluetooth low energy (BLE)), ultra-wide band (UWB), wireless USB, or near-field communication (NFC). For example, the communication circuit 390 may communicate with the electronic device 201 through short-range communication such as Bluetooth, Wi-Fi, or NFC. If the hub device 302 is not located within a radius of short-range communication of the electronic device 201, the communication circuit 390 may communicate with the electronic device 201, based on long-range communication scheme such as long-term evolution (LTE).

Figure 4:
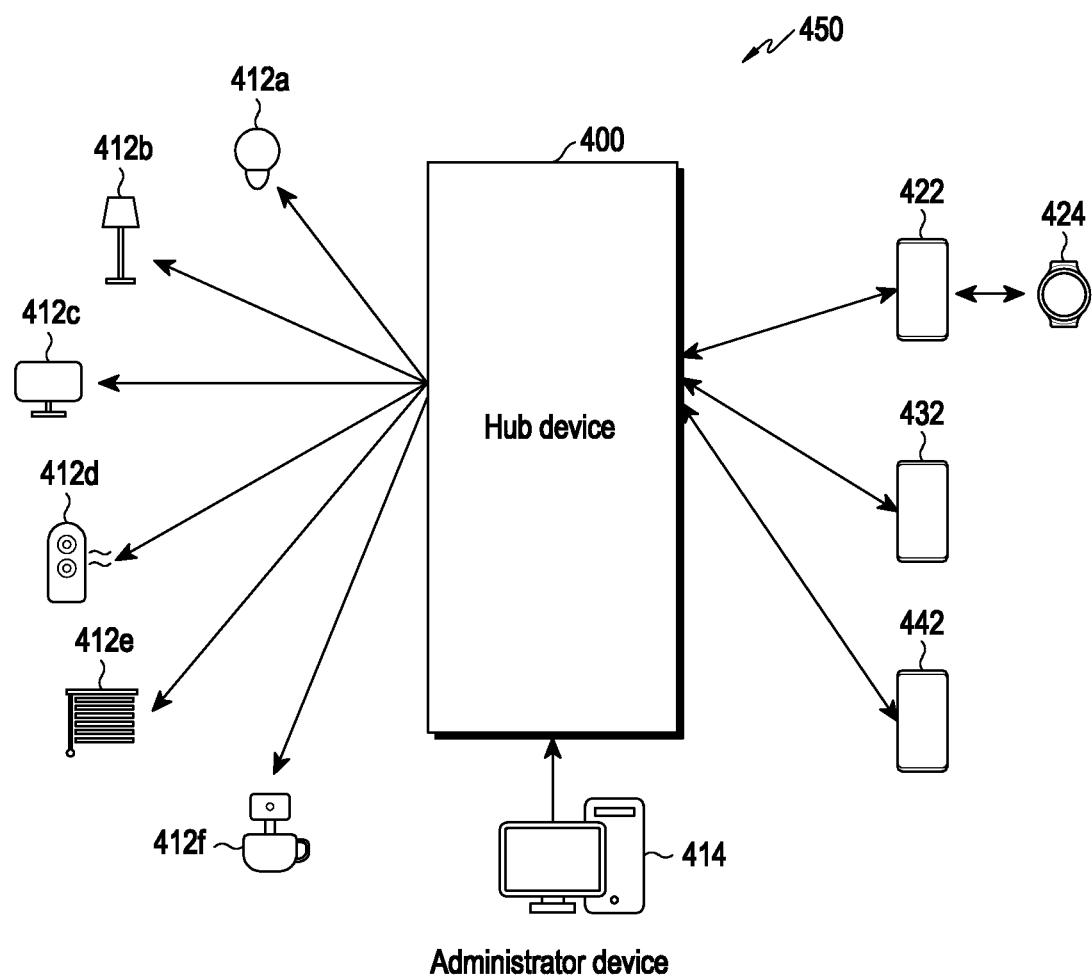
FIG. 4 is a diagram illustrating a network according to various embodiments.

FIG. 4 is a diagram illustrating a network 450 according to various embodiments.

Referring to FIG. 4, the network 450 may include a hub device 400 (e.g., the hub device 302), at least one electronic device 422, 432, 442, or 424 (e.g., the device 124 or the electronic device 201) capable of operating as a controller device, and at least one IoT device 412a, 412b, 412c, 412d, 412e, or 412f (e.g., the target devices 121, 122, 123, 151, 152, and 153) capable of operating as a controlled device.

In an embodiment, each of the electronic devices 422, 432, 442, and 424 may identify the states of the IoT devices 412a, 412b, 412c, 412d, 412e, and 412f to be used in an IoT control service or control the operation of the IoT devices 412a, 412b, 412c, 412d, 412e, and 412f, and the electronic devices 422, 432, 442, and 424 may be, for example, a personal electronic device such as a smartphone, a tablet, or a wearable device or an electronic device equipped with a display and a user interface, such as a television set or a control console. The electronic devices 422, 432, 442, and 424 may correspond to different users, respectively, or at least one user.

In an embodiment, the electronic devices 422, 432, 442, and 424 may communicate with the hub device 400 using a long-range communication network such as the Internet, a computer network (e.g., LAN or WAN), or a cellular network or a short-range communication network such as Bluetooth, Wi-Fi, or NFC. In an embodiment, the electronic devices 422, 432, 442, and 424 may communicate with the IoT devices 412a, 412b, 412c, 412d, 412e, and 412f using a long-range communication network or a short-range communication network. In an embodiment, the electronic devices 422, 432, 442, and 424 may control the IoT devices 412a, 412b, 412c, 412d, 412e, and 412f through the hub device 400 or directly control the IoT devices 412a, 412b, 412c, 412d, 412e, and 412f (e.g., not through the hub device 400), based on authentication of the hub device 400.

In an embodiment, at least one (e.g., the electronic device 442) of the electronic devices 422, 432, 442, and 424 may be a device possessed by the user who wishes to control the IoT devices 412a, 412b, 412c, 412d, 412e, and 412f without the onboarding procedure for registration on the network 450. As an example, the electronic device 442 may be allowed to control the IoT devices 412a, 412b, 412c, 412d, 412e, and 412f with the temporary control authority by the hub device 400.

In an embodiment, the electronic device 424 may be a wearable device and communicate with the hub device 400 through at least one (e.g., the electronic device 422) of the electronic devices 422, 432, and 442. In an embodiment, the hub device 400 may store and manage device information related to the electronic devices 422, 432, and 442 for each of one or more users registered in the network 450 and the wearable device 424 corresponding thereto in the memory (e.g., the memory 330 in FIG. 3).

In an embodiment, the IoT devices 412a, 412b, 412c, 412d, 412e, and 412f may be controlled by the hub device 400 or at least one of the electronic devices 422, 432, 442, and 424 and may be, for example, home appliances such as lighting equipment, television, an air conditioner, window treatment, a coffee machine, a washing machine, or a door lock. The IoT devices 412a, 412b, 412c, 412d, 412e, and 412f may be connected to the hub device 400 using wired communication or wireless communication and/or may be connected directly (e.g., not through the hub device 400) to at least one of the electronic devices 422, 432, 442, and 424.

In an embodiment, the hub device 400 may be an electronic device that operates an IoT control service and may be a server or gateway disposed inside a building (home or hotel) or a remote server disposed outside the building. In an embodiment, the hub device 400 may be a home appliance having a hub function, such as a smartphone, a tablet, a personal computer (PC), or television (TV). The hub device 400 may store and manage information for the IoT control service (e.g., information about the IoT devices 412a, 412b, 412c, 412d, 412e, and 412f and the electronic devices 422, 432, 442, and 424).

In an embodiment, the hub device 400 may receive a request (e.g., control information or a control command) related to control (e.g., execution of a specific action) of at least one IoT device 412a, 412b, 412c, 412d, 412e, or 412f (e.g., the IoT device 412a) from at least one electronic device 422, 432, 442, or 424 (e.g., the electronic device 442) and determine control authority of the electronic device 442, having transmitted the request, for the IoT device 412a and availability thereof, thereby rejecting the request of the electronic device 442 or determining whether or not to perform transmission to the IoT device 412a. If the request is acceptable (e.g., if the electronic device 442 having transmitted the request has control authority over the IoT device 412a), the hub device 400 may transmit, to the IoT device 412a, control commands instructing to execute the specific action requested.

In an embodiment, the hub device 400 may communicate with an administrator device 414. The administrator device 414 may serve to assist a connection between at least one of the electronic devices 422, 424, 432, and 442 and the hub device 400, and may store information used for connection with the hub device 400 (hereinafter, referred as connect information) and dynamically produce a connection code including the connect information. In an embodiment, the administrator device 414 may be software implemented inside the hub device 400. In an embodiment, the administrator device 414 may be a PC, a server, a smartphone, or a tablet.

In an embodiment, in a business-to-customer (B2C) scenario, at least one electronic device (e.g., the electronic device 442) may be a smartphone of a guest visiting home, the hub device 400 may be a home network hub (e.g., a home server or a gateway) installed at home, the IoT devices 412a, 412b, 412c, 412d, 412e, and 412f may be TV, a refrigerator, or a light installed at home, and the administrator device 414 may be a smartphone, a tablet, or a PC of the host or home owner.

In an embodiment, in a business-to-business (B2B) scenario, at least one electronic device (e.g., the electronic device 442) may be a smartphone of a customer who stays at a hotel, the hub device 400 may be a hub installed inside a room of the hotel, the IoT devices 412a, 412b, 412c, 412d, 412e, and 412f may be TV, a refrigerator, or a light installed inside a room, and the administrator device 414 may be a smartphone, a tablet, or a PC of a manager in the hotel.

In an embodiment, the administrator device 414 may be the same device or function as the hub device 400. For example, the administrator device 414 may be a device such as a smartphone, a tablet, or TV having a hub function, and the hub device 400 may include software for executing an administrator function.

Figure 5:
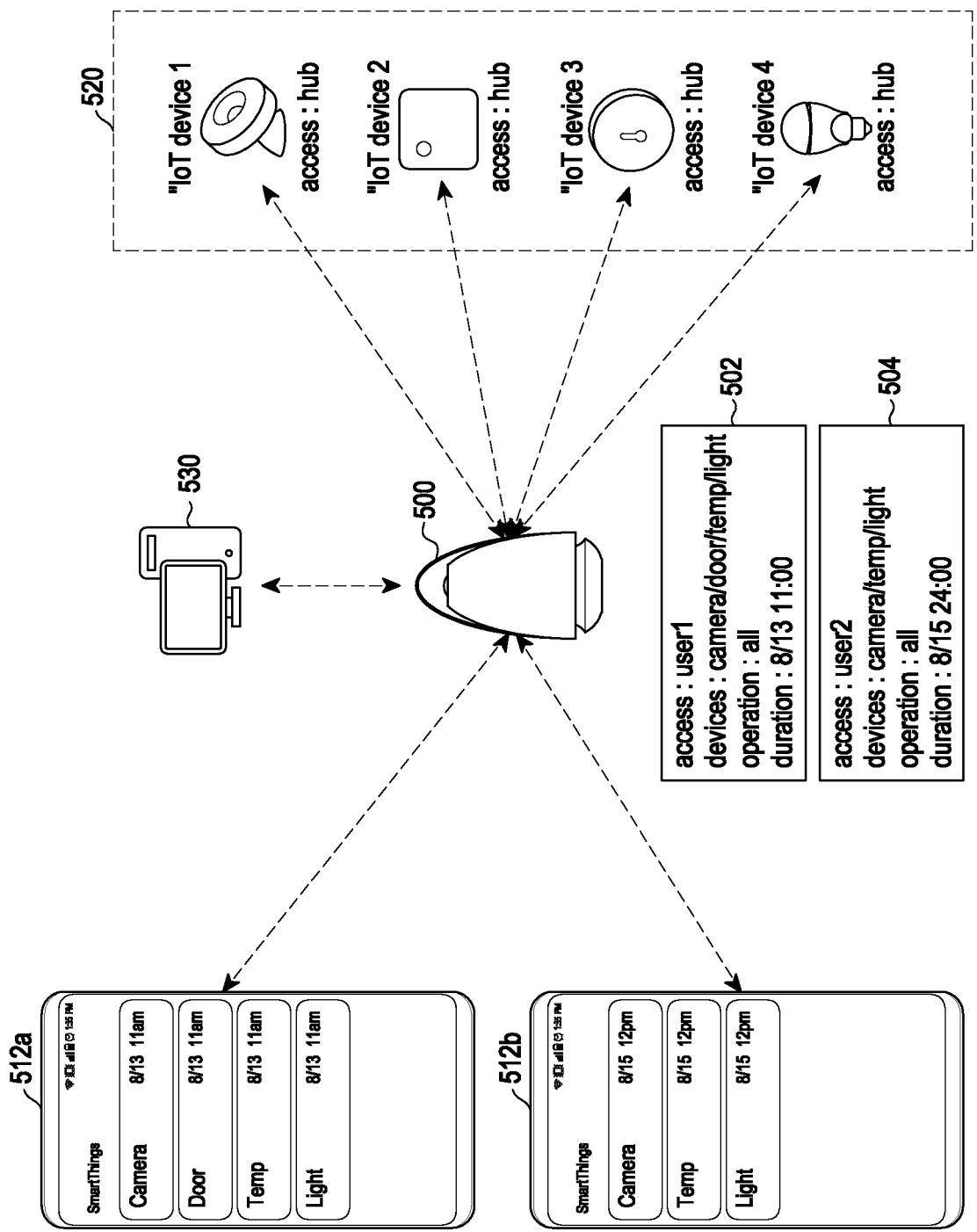
FIG. 5 is a diagram illustrating a system for controlling IoT devices according to various embodiments.

FIG. 5 is a diagram illustrating a system for controlling IoT devices according to various embodiments.

Referring to FIG. 5, at least one electronic device 512a or 512b (e.g., the electronic device 201) may control IoT devices 520 through a hub device 500. In an embodiment, the electronic device 512a may obtain connect information for connection with the hub device 500 and control information for controlling the IoT devices 520 through an administrator device 530. In an embodiment, the electronic device 512a may obtain connect information including user information (e.g., a user identification (ID)) possessing the electronic device 512a from the administrator device 530 and identify connect information using the user ID. In an embodiment, connect information may be used for the electronic device 512a to perform secure communication with the hub device 500. In an embodiment, the electronic device 512a may produce a control command for controlling at least one of the IoT devices 520 using the control information, and the control command may be transmitted to a corresponding IoT device through the hub device 500.

In an embodiment, the administrator device 530 may produce a connection code (e.g., a quick response (QR) code, a numeric code, or an NFC tag) including the connect information and the control information, and the electronic device 512a may obtain the connect information and the control information using the connection code. In an embodiment, the connection code may include an Internet address for obtaining the connect information and the control information. In an embodiment, the administrator device 530 may transmit the connection code to the electronic device 512a using NFC or other communication schemes (e.g., Bluetooth or Wi-Fi). In an embodiment, the electronic device 512a may obtain or receive the control information from the hub device 500.

In an embodiment, the electronic device 512a may identify control authority over at least one of the IoT devices 520, for example, a camera, a door lock, a temperature sensor, and a light, based on the control information provided from the administrator device 530. In an embodiment, the control information may indicate that control authority is permitted for the camera, the door lock, the temperature sensor, and the light until 11:00 am on August 13th. In an embodiment, the control information may further include a list of controllable actions (e.g., an access list) for the camera, the door lock, the temperature sensor, and the light. As an example, the actions may include locking/unlocking the door lock, requesting the state of the temperature sensor, or turning on/off the light. The electronic device 512a may produce control command for the camera, the door lock, the temperature sensor, or the light using the control information and transmit the control command to a corresponding IoT device (i.e., the camera, the door lock, the temperature sensor, or the light) through the hub device 500.

In an embodiment, another electronic device (e.g., the electronic device 512b) may identify control authority over at least one of the IoT devices 520, such as the camera, the temperature sensor, and the light, based on the control information provided from the administrator device. In an embodiment, the control information may indicate that control authority is permitted for the camera, the temperature sensor, and the light until 12:00 pm on August 15th. In an embodiment, the control information may further include a list of controllable actions for the camera, the temperature sensor, and the light. The electronic device 512b may produce a control command for the camera, the temperature sensor, or the light using the control information and transmit the control command to a corresponding IoT device (i.e., the camera, the temperature sensor, or the light) through the hub device 500.

In an embodiment, the hub device 500 may receive the control information (e.g., including first control information 502 and second control information 504) indicating permitted control authority over at least one electronic device (e.g., the electronic device 512a and/or the electronic device 512b) from the administrator device 530. In an embodiment, first control information 502 for a user (e.g., user1) corresponding to the electronic device 512a may include a list of controllable devices (e.g., the camera, the door lock, the temperature sensor, and the light), controllable actions (e.g., all actions "all"), and a period for which the control is permitted (e.g., 11:00, August 13th). In an embodiment, second control information 504 for another user (e.g., user2) corresponding to the electronic device 512b may include a list of controllable devices (e.g., the camera, the temperature sensor, and the light), controllable actions (e.g., all actions "all"), and a period for which control is permitted (e.g., 24:00, August 15th).

In an embodiment, the IoT devices 520 may include one or more home appliances controllable by the hub device 500, such as an air conditioner, a temperature sensor, a door lock, or a light. In an embodiment, the hub device 500 may store and manage control authority over each IoT device, which permits, for example, access to the hub device 500 ("access: hub").

Figure 6:
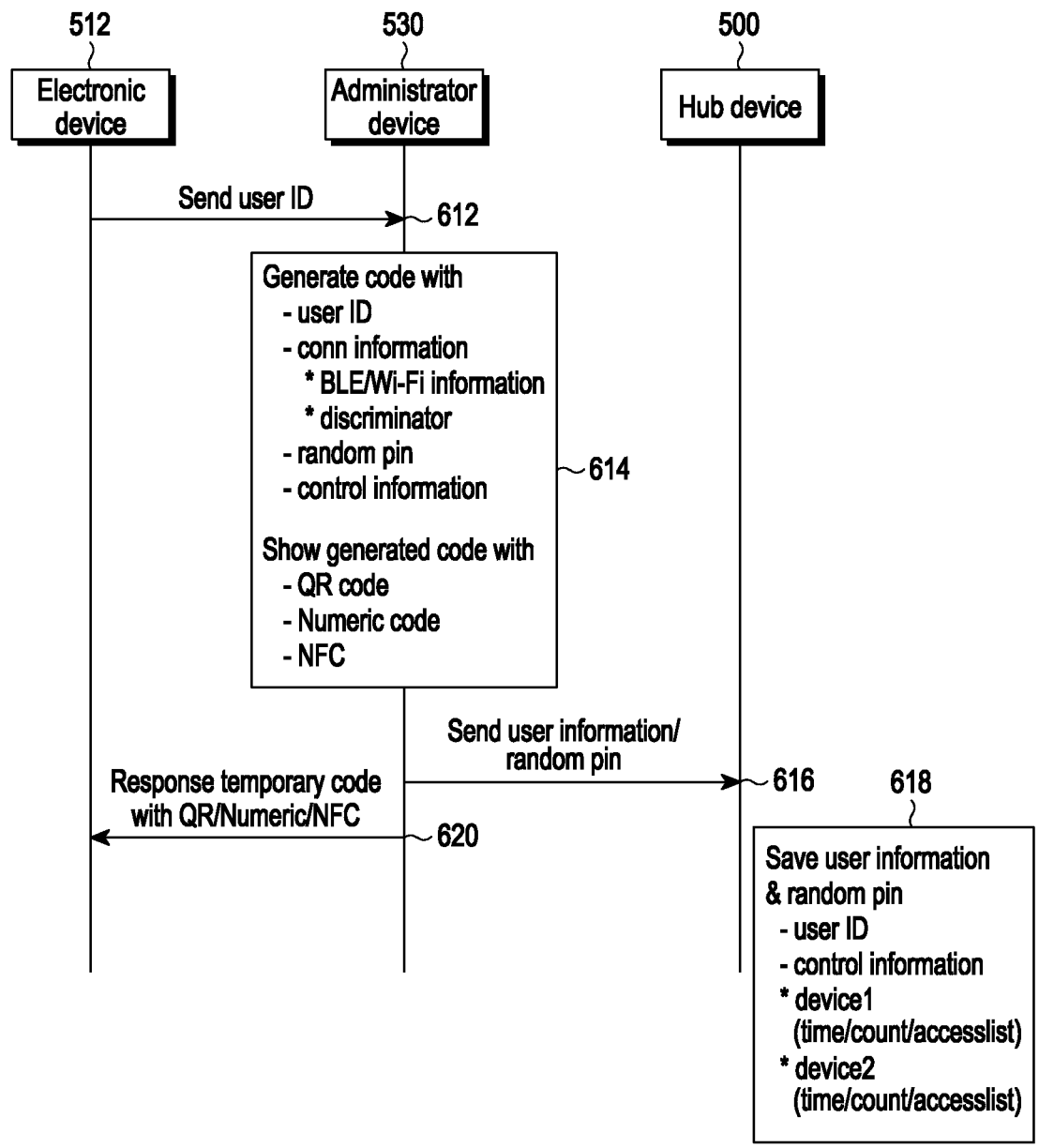
FIG. 6 is a signal flowchart illustrating a procedure for obtaining connect information of a hub device according to an embodiment.

FIG. 6 is a signal flowchart illustrating a procedure for obtaining connect information of a hub device according to an embodiment. In an embodiment, the electronic device 512 may be the electronic device 201 in FIG. 2, and at least one of the operations described below may be executed by the processor 220 of the electronic device 201. In an embodiment, the hub device 500 may be the hub device 302 in FIG. 3, and at least one of the operations described below may be executed by the processor 320 of the hub device 302.

Referring to FIG. 6, in operation 612, the electronic device 512 (e.g., the electronic device 512a or the electronic device 512b) may transmit user information (e.g., at least one user ID) to the administrator device 530. In an embodiment, each user ID may include a user name or nickname that is configured by the user (e.g., the owner of the electronic device 512 or the operator of the administrator device 530) and shared with electronic device 512. In an embodiment, the electronic device 512 may provide the administrator device 530 with at least one of a user ID of the owner of the electronic device 512 or a user ID of another user. In an embodiment, the electronic device 512 may install an application capable of controlling IoT devices (e.g., the IoT devices 520) through the hub device 500 in the electronic device 512. After the user ID is configured through the application or input from the user, the electronic device 512 may transmit the user ID to the administrator device 530. In an embodiment, the user ID may be transmitted from the electronic device 512 to the administrator device 530 using a communication scheme such as at least one of Bluetooth, Wi-Fi, or NFC. In an embodiment, the administrator device 530 may receive the user ID from the user through an input means (e.g., a keyboard) of the administrator device 530. In this case, the operation of transmitting the user ID to the administrator device 530 by the electronic device 512 may be omitted. The user ID may be identified by or input into the electronic device 512 in the same manner.

In operation 614, the administrator device 530 may produce a connection code including at least one of the user ID, connect information for connection with the hub device 500, a random personal identification number (PIN), or control information for controlling the IoT devices 520. In an embodiment, the user ID may be received from the electronic device 512 or input from the user in operation 612. In an embodiment, the random PIN is a value for authentication for connection with the hub device 500, and may be randomly produced in the administrator device 530 and have a designated effective time. As an example, the effective time may be configured by the user or may be configured as a designated value.

In an embodiment, the connect information may be Bluetooth information (e.g., a Bluetooth low energy (BLE) media access control (MAC) address of the hub device 500) or Wi-Fi information (e.g., a Wi-Fi MAC address of the hub device 500) to be used for connection with the hub device 500. In an embodiment, the connect information may further include discriminator information indicating a phase shift for wireless frequency connection with the hub device 500.

In an embodiment, the control information may include a list of one or more IoT devices controllable through the hub device 500 (e.g., a list including names of one or more IoT devices) and information indicating control authority permitted for each IoT device (e.g., an effective time, an effective count, or an access list). The effective time may indicate the duration permitted for the electronic device 512 to control the IoT device. The effective count may indicate the number of times the electronic device 512 is able to control the IoT device. The access list may include actions of the IoT device controllable by the electronic device 512.

In operation 616, the administrator device 530 may transmit the user ID and the random PIN to the hub device 500. In an embodiment, the administrator device 530 may transmit the control information to the hub device 500. In an embodiment, the control information may be directly transmitted from the administrator device 530 to the hub device 500 or may be transmitted from the administrator device 530 to the hub device 500 through at least one other server. In an embodiment, the administrator device 530 may provide access information (e.g., URL) for accessing the control information to the hub device 500, and the hub device 500 may obtain the control information, based on the access information. In an embodiment, the hub device 500 may already recognize control authority over IoT devices, which is permitted to the electronic device 512 for a limited time, and in this case, the control information may not be transmitted to the hub device 500.

In operation 618, the hub device 500 may store the user ID and the random PIN. In an embodiment, the hub device 500 may identify the control authority permitted to the electronic device 512 (e.g., the effective time, the effective count, or the access list), based on the control information received from the administrator device 530. In an embodiment, the control information provided by the administrator device 530 may include an effective time, an effective count, or an access list for each of the one or more users (e.g., the user 1 corresponding to the electronic device 512a and the user 2 corresponding to the electronic device 512b).

In operation 620, the administrator device 530 may transmit a response message ("temporary code with QR/Numeric/NFC") including a connection code to the electronic device 512. In an embodiment, the response message may be transmitted using NFC or other communication schemes (e.g., Bluetooth or Wi-Fi). In another embodiment, the connection code may be produced in the form of a QR code, a numeric code, or an NFC tag to be displayed on a display of the administrator device 530 and may be input to the electronic device 512 through a camera (e.g., the camera module 280), an input module (e.g., the input module 250), or a communication module (e.g., the communication module 290) of the electronic device 512. The electronic device 512 may obtain at least one of a user ID, connect information, a random PIN, or control information using the connection code.

Figure 7:
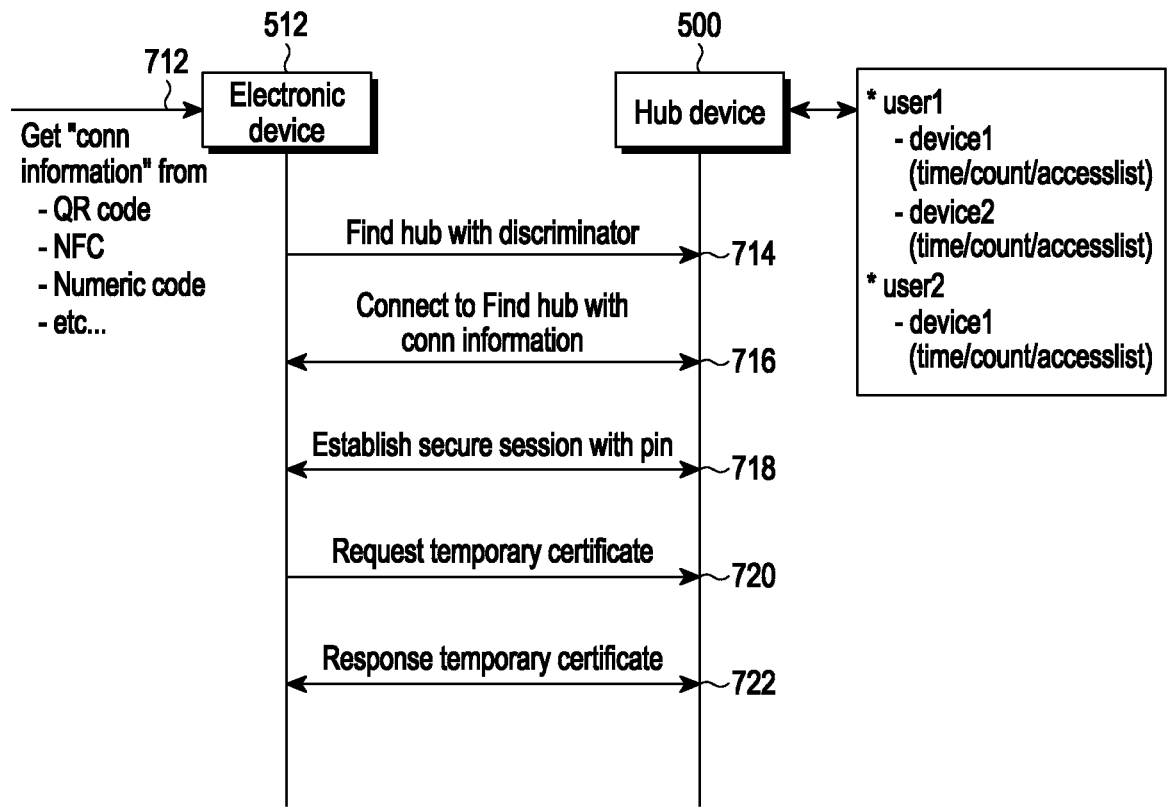
FIG. 7 is a flowchart illustrating a procedure for receiving a temporary certificate according to an embodiment.

FIG. 7 is a flowchart illustrating a procedure for receiving a temporary certificate according to an embodiment. In an embodiment, the electronic device 512 may be the electronic device 201 in FIG. 2, and at least one selected from the operations described below may be executed by the processor 220 of the electronic device 201. In an embodiment, the hub device 500 may be the hub device 302 in FIG. 3, and at least one selected from the operations described below may be executed by the processor 320 of the hub device 302.

Referring to FIG. 7, in operation 712, the electronic device 512 (e.g., the electronic device 512a or the electronic device 512b) may obtain connect information for connection with the hub device 500 from the connection code (e.g., the connection code obtained in operation 620). In an embodiment, the connection code may be produced by the administrator device 530 using a user ID of the electronic device 512 (e.g., a user ID assigned to or determined by a user of the electronic device 512). In an embodiment, the connection code may be provided in the form of a QR code, a numeric code, or an NFC tag through the display of the administrator device 530 and may be captured by the camera of electronic device 512. In an embodiment, the electronic device 512 may receive or obtain the connection code and determine whether or not the user ID included in the connection code matches the user ID of the electronic device 512. If the user ID included in the connection code and the user ID of the electronic device 512 match each other, operation 714 may be performed.

In operation 714, the electronic device 512 may search for and discover the hub device 500 using discriminator information included in the connect information. In an embodiment, the hub device 500 may receive and store the user ID of the electronic device 512, the random PIN, or the control information of the electronic device 512 from the administrator device 530 before operation 714.

In operation 716, the electronic device 512 may be connected to the hub device 500 using a MAC address of the hub device 500 included in the connect information. In operation 718, the electronic device 512 may establish a secure session (e.g., a first secure channel) with the hub device 500 using the random PIN included in the connect information. In an embodiment, the electronic device 512 may identify an effective time of the random PIN before operation 718. In such an embodiment, if the effective time elapses so that the random PIN is no longer available, the electronic device 512 may display a notification notifying that device control is impossible, and determine not to perform subsequent operation (e.g., operation 718).

In an embodiment, the hub device 500 may receive a request for connection of a secure session including the random PIN from the electronic device 512 and determine whether or not the received random PIN matches a random PIN of the electronic device 512, which is previously provided (e.g., received from the administrator device 530). If the received random PIN from the electronic device 512 and the previously provided random PIN of the electronic device 512 match each other, the hub device 500 may permit establishment of the secure session and connect the first secure channel through the secure session. In an embodiment, the hub device 500 may further use the user ID, as well as the random PIN, for authentication of the electronic device 512. As an example, the hub device 500 may permit establishment of the secure session if the user ID and the random PIN received from the electronic device 512 match the previously provided user ID of the electronic device 512 and the previously provided random PIN, respectively. In an embodiment, the hub device 500 may identify an effective time of the random PIN received from the electronic device 512. In such an embodiment, if the effective time elapses so that the random PIN is no longer available, the hub device 500 may reject the establishment of the secure session.

In operation 720, the electronic device 512 may transmit a request message requesting a temporary certificate for device control to the hub device 500 through the first secure channel. In operation 722, the hub device 500 may transmit, to the electronic device 512, a response message including the temporary certificate through the first secure channel.

Figure 8:
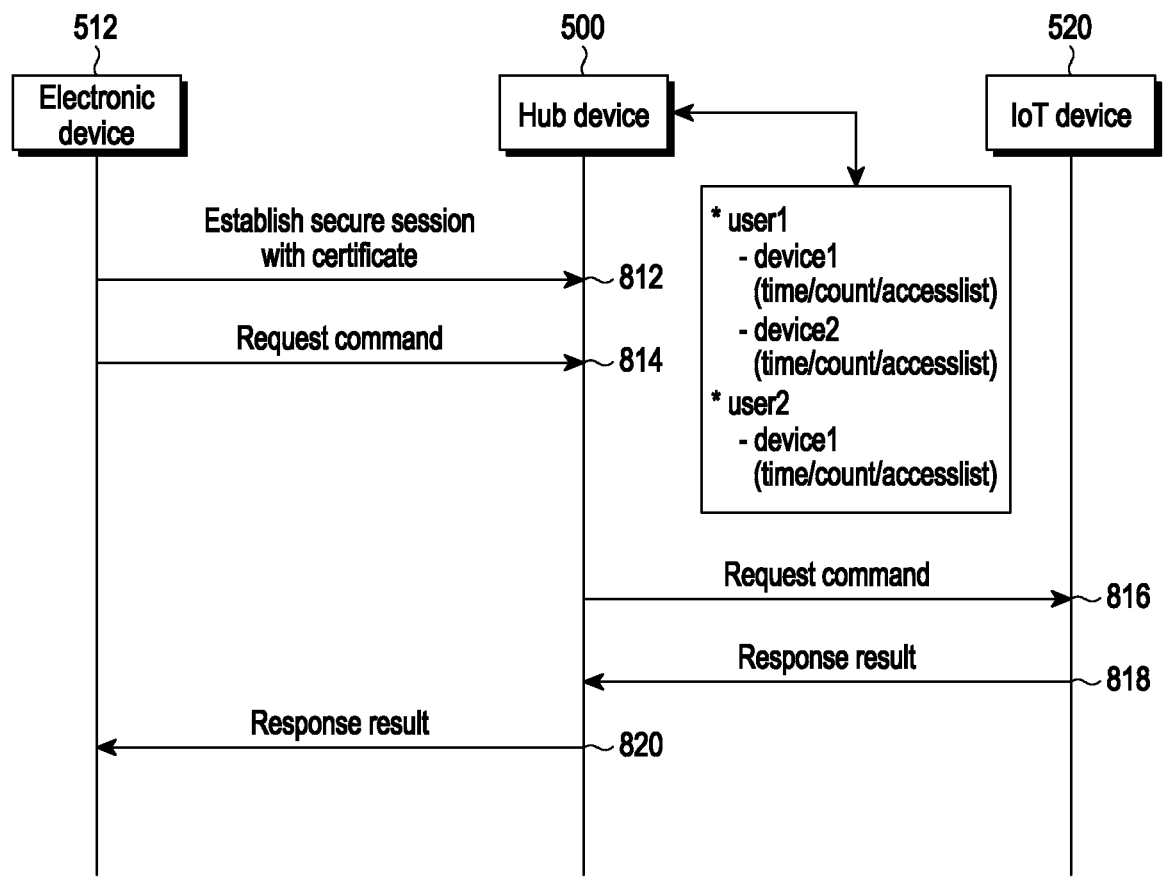
FIG. 8 is a signal flowchart illustrating a procedure for controlling an IoT device according to an embodiment.

FIG. 8 is a signal flowchart illustrating a procedure for controlling an IoT device according to an embodiment. In an embodiment, the electronic device 512 may be the electronic device 201 in FIG. 2, and at least one selected from the operations described below may be executed by the processor 220 of the electronic device 201. In an embodiment, the hub device 500 may be the hub device 302 in FIG. 3, and at least one selected from the operations described below may be executed by the processor 320 of the hub device 302.

Referring to FIG. 8, in operation 812, the electronic device 512 (e.g., the electronic device 512a or the electronic device 512b) may establishing a secure session (e.g., a second secure channel) with the hub device 500 using a certificate (e.g., the temporary certificate received in operation 722). In an embodiment, the electronic device 512 may establish a second secure channel by transmitting a request for connection of a secure session including the certificate to the hub device 500. The hub device 500 may verify the certificate included in the connection request, based on the temporary certificate transmitted in operation 722, thereby permitting the connection of the second secure channel.

In operation 814, the electronic device 512 may request a message including control command for controlling the IoT device 520 from the hub device 500 through the second secure channel.

In an embodiment, the electronic device 512 may display, on the display module (e.g., the display module 260), an access list indicating a list of controllable IoT devices and controllable actions of the IoT devices, based on control information (e.g., the control information obtained using the connection code in operation 620) related to control authority of the IoT devices. In an embodiment where the electronic device 512 receives selection of an IoT device to be controlled and selection of a controllable action for the selected IoT device based on the list, the electronic device 512 may produce a control command indicating the selected action of the selected IoT device and include the control command in the request message. In an embodiment, the electronic device 512 may display, on the display module, the IoT devices of which the control is permitted to the electronic device 512 and the related actions thereof, based on the control information.

In an embodiment, the hub device 500 may pre-store control information (e.g., the control information received in operation 616) related to one or more IoT devices. In an embodiment, the control information may include first control information (e.g., the first control information 502) and/or second control information (e.g., the second control information 504) indicating permitted control authority over the electronic devices (e.g., the electronic device 512a and/or the electronic device 512b). The first control information 502 corresponding to the electronic device 512a ("user1") may include at least one of a list of devices (e.g., "device1" and "device2") controllable by the electronic device 512a, an effective time for which control is permitted, an effective count, or an access list. The second control information 504 corresponding to the electronic device 512b ("user2") may include at least one of a list of devices (e.g., "device1") controllable by the electronic device 512b, an effective time for which control is permitted, an effective count, or an access list.

In an embodiment, the hub device 500 may verify the control command received from the electronic device 512, based on the control information. As an example, the hub device 500 may identify the control information (e.g., the first control information 502) corresponding to the electronic device 512, based on user information (e.g., a name of a user or a user ID) of the electronic device 512. If the first control information 502 includes an IoT device corresponding to the control command and if the action instructed by the control command is included in the access list of the first control information 502, the hub device 500 may determine to permit the control command and proceed to operation 816.

In operation 816, the hub device 500 may transmit the control command received from the electronic device 512 to a corresponding IoT device 520. The IoT device 520 may execute a corresponding action in response to the control command. As an example, the IoT device 520 may be a door lock, and the action may include locking a door lock or unlocking the door lock. As an example, the IoT device 520 may be a light, and the action may include turning on/off the light.

In operation 818, the IoT device 520 may include an execution result (e.g., locking/unlocking the door lock or turning on/off the light) indicating the result of executing the action in a response message to report the same to the hub device 500. In operation 820, the hub device 500 may transmit the execution result to the electronic device 512. In an embodiment, the electronic device 512 may display a message (text or an image) indicating the execution result on the display module (e.g., the display module 260).

Figure 9:
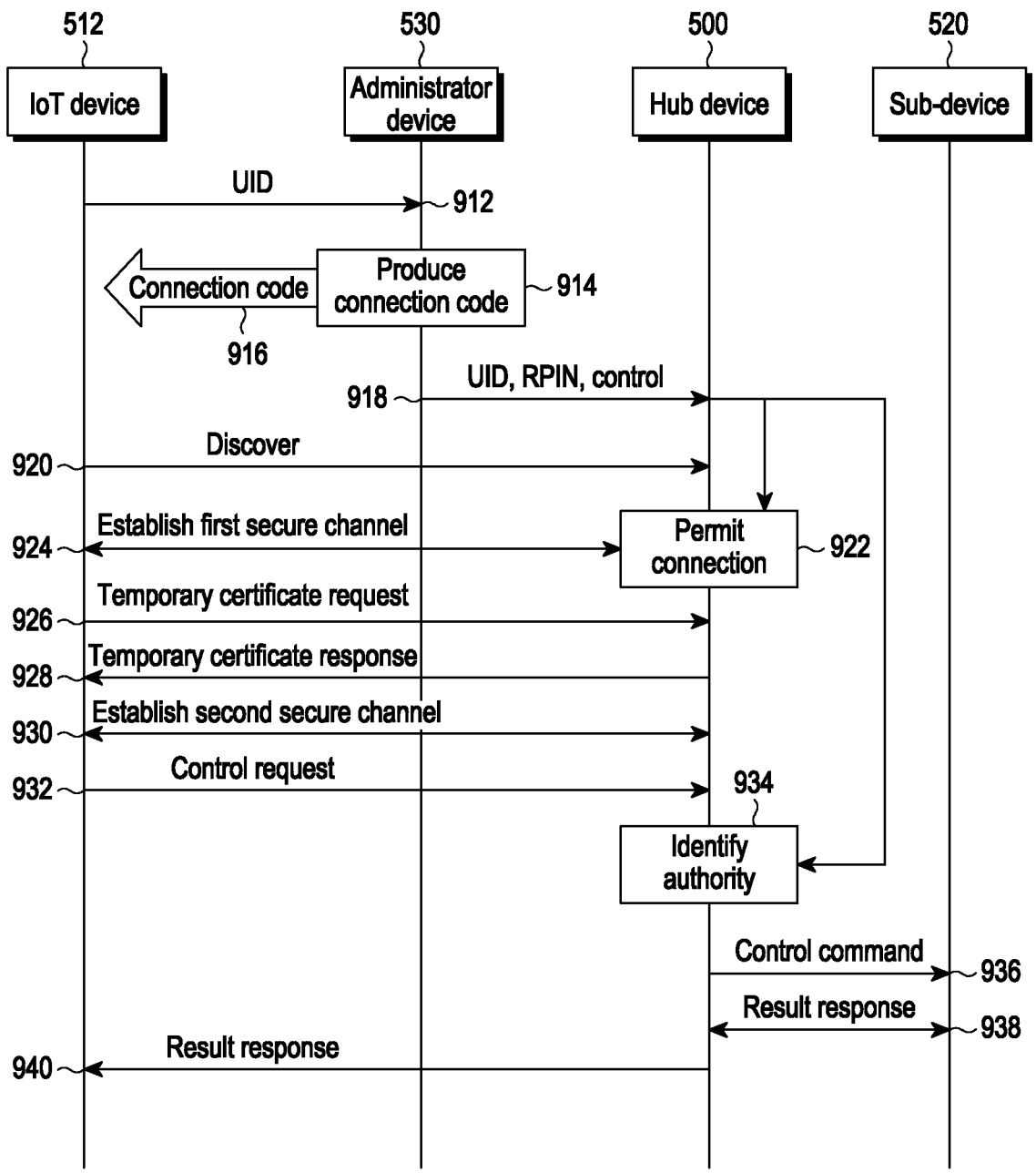
FIG. 9 is a flowchart illustrating an example of a procedure for controlling an IoT device using temporary control authority according to an embodiment.

FIG. 9 is a flowchart illustrating an example of a procedure for controlling an IoT device using temporary control authority according to an embodiment.

Referring to FIG. 9, in operation 912, the electronic device 512 (e.g., the electronic device 512a or the electronic device 512b) may transmit user information, for example, a user ID, to the administrator device 530. In an embodiment, the administrator device 530 may receive the user ID of the electronic device 512 using a short-range communication scheme or long-range communication scheme. In another embodiment, the administrator device 530 may receive the user ID from a user of the electronic device 512, instead of receiving the user ID from the electronic device 512.

In operation 914, the administrator device 530 may produce a connection code including at least one of the user ID, connect information for the hub device 500, a random PIN, or control information on the IoT device 520.

In operation 916, the electronic device 512 may obtain the connection code. In an embodiment, the connection code may be implemented as a QR code, a numeric code, or an NFC tag and provided through another means such as a display of the administrator device 530, a sticker, or a pamphlet, and the electronic device 512 may obtain the connection code by capturing a QR code or numeric code using a camera module (e.g., the camera module 280) or by coming into contact with an NFC tag using the communication module 290. In an embodiment, the connection code may be printed on a sticker or pamphlet accessible in the limited building such as a home network or hotel network, and the electronic device 512 may obtain the connection code and obtain at least one of the user ID, the connect information, the random PIN, or the control information using the connection code without inputting or transmitting the user ID.

In operation 918, the administrator device 530 may transmit, to the hub device 500, at least one of the user ID, the random PIN, or the control information, which is the same as that provided to the electronic device 512 through the connection code. The hub device 500 may store the at least one of the received user ID, the random PIN, or the control information.

In operation 920, the electronic device 512 may discover the hub device 500 using the connect information (e.g., discriminator information of the hub device 500) obtained using the connection code. In operation 924, the electronic device 512 may establish a first secure channel with the hub device 500 using the connect information (e.g., a MAC address of the hub device 500) and/or the random PIN. In operation 922, the hub device 500 may permit connection with the electronic device 512 through the first secure channel using the user ID and/or the random PIN obtained in operation 918.

In operation 926, the electronic device 512 may request a temporary certificate from the hub device 500 through the first secure channel. In operation 928, the hub device 500 may provide the requested temporary certificate to the electronic device 512 through the first secure channel.

In operation 930, the electronic device 512 may establish a second secure channel with the hub device 500 using the temporary certificate. In operation 932, the electronic device 512 may produce a control command for the IoT device 520 using the control information (e.g., an effective time, an effective count, or an access list related to the control authority of the IoT device 520) obtained using the connection code in operation 916 and transmit a control request message including the control command to the hub device 500 through the second secure channel.

In operation 934, the hub device 500 may determine whether or not to permit the control command using the control information obtained in operation 918. As an example, the hub device 500 may determine whether or not the electronic device 512 has control authority over the IoT device 520, based on the control information. If it is determined that the electronic device 512 has control authority over the IoT device 520, the hub device 500 may transmit the control command to a sub-device 520 in operation 936. The hub device 500 may receive a result response message including an execution result in response to the control command in operation 938, and the hub device 500 may transmit the result response message to the electronic device 512 in operation 940.

Figure 10:
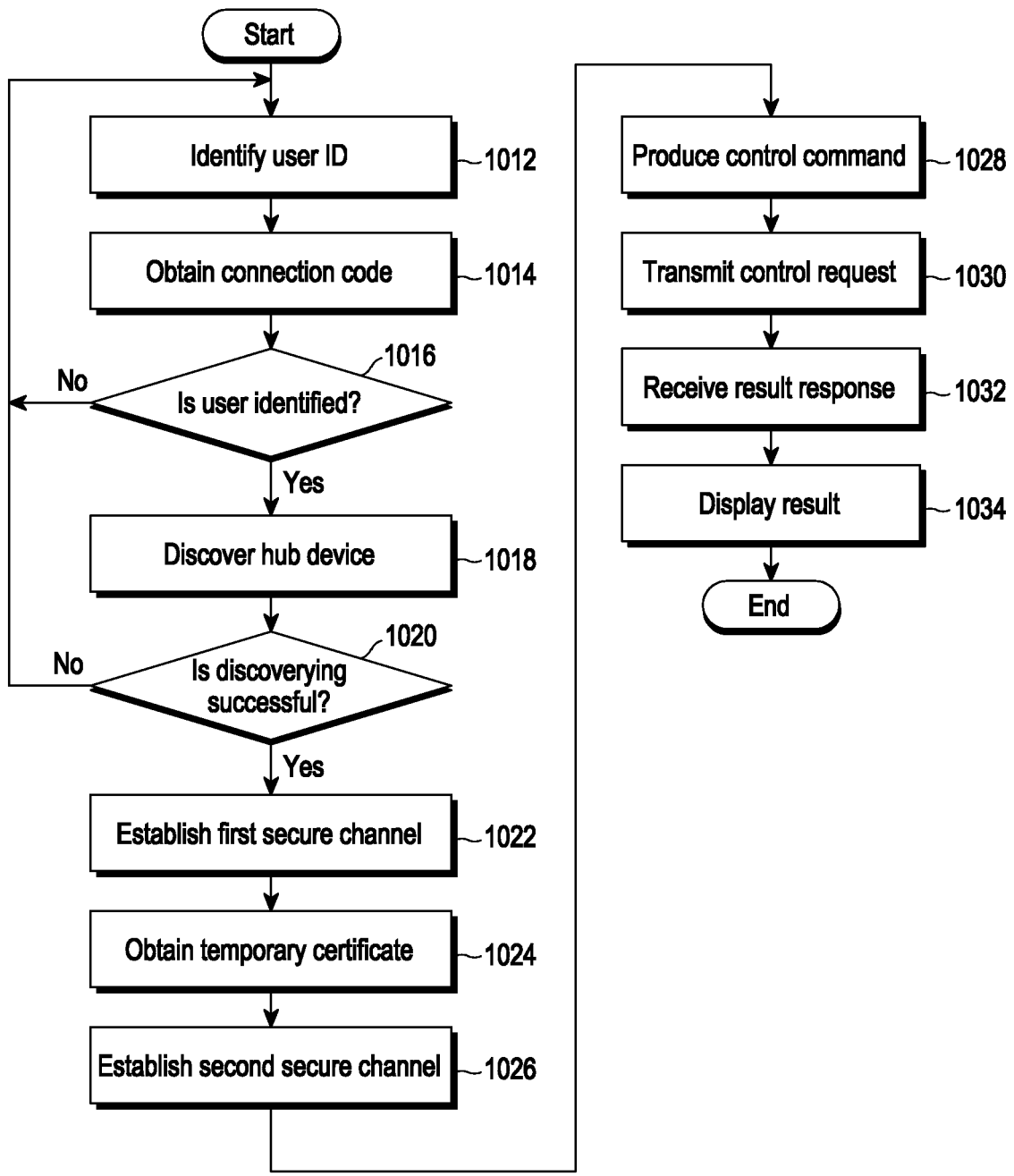
FIG. 10 is a flowchart illustrating an operation of controlling an IoT device according to an embodiment.

FIG. 10 is a flowchart illustrating an operation of controlling an IoT device according to an embodiment. In an embodiment, the electronic device 512 may be the electronic device 201 in FIG. 2, and at least one selected from the operations described below may be executed by the processor 220 of the electronic device 201. In various embodiments, at least one selected from the operations described below may be omitted, modified, or performed in different sequence.

Referring to FIG. 10, in operation 1012, the electronic device 512 (e.g., the processor 220) may identify a user ID to be used for control of an IoT device. In an embodiment, the electronic device 512 (e.g., the processor 220) may receive a user ID from the user through an input module (e.g., the input module 250).

In operation 1014, the electronic device 512 (e.g., the processor 220) may obtain connection code for control of an IoT device. In an embodiment, the connection code may be implemented in the form of a QR code, a numeric code, or an NFC code, and the electronic device 512 (e.g., the processor 220) may obtain the connection code through the camera module 280, the input module 250, or the communication module 290. In an embodiment, the connection code may include at least one of a user ID, connect information, a random PIN, or control information. In an embodiment, the connection code may include an Internet address (e.g., URL), and the electronic device 512 (e.g., the processor 220) may obtain at least one of a user ID, connect information, a random PIN, or control information from the Internet address.

In operation 1016, the electronic device 512 (e.g., the processor 220) may determine whether or not the user ID included in the connection code (or obtained using the connection code) matches the user ID of the electronic device 512 in operation 1012. If the user ID included in the connection code and the user ID of the electronic device 512 do not match each other, the electronic device 512 (e.g., the processor 220) may determine that the connection code is not appropriate and return to operation 1012. If the user ID included in the connection code and the user ID of the electronic device 512 match each other, the electronic device 512 (e.g., the processor 220) may proceed to operation 1018. In an embodiment, operation 1012 and operation 1014 may be omitted, and the electronic device 512 (e.g., the processor 220) may obtain at least one of the connect information, the random PIN, or the control information using the connection code without the user ID.

In operation 1018, the electronic device 512 (e.g., the processor 220) may search for a hub device (e.g., the hub device 500) using the connect information (e.g., discriminator information) included in the connection code (or obtained using the connection code). If the hub device 500 is found in operation 1020, the electronic device 512 (e.g., the processor 220) may proceed to operation 1022. If the hub device 500 corresponding to the connect information fails to be found, the electronic device 512 (e.g., the processor 220) may perform the operation of identifying the user ID in operation 1012 again.

In operation 1022, the electronic device 512 (e.g., the processor 220) may establish a first secure channel with the hub device 500 using the connect information (e.g., a MAC address and/or a random PIN). In operation 1024, the electronic device 512 (e.g., the processor 220) may obtain a temporary certificate from the hub device 500 through the first secure channel. In operation 1026, the electronic device 512 (e.g., the processor 220) may establish a second secure channel with the hub device 500 using the temporary certificate.

In operation 1028, the electronic device 512 (e.g., the processor 220) may produce control command for an IoT device (e.g., the IoT device 520) using the control information (e.g., at least one of an IoT device name, an effective time, an effective count, or an access list) included in the connection code (or obtained using the connection code). In an embodiment, the electronic device 512 (e.g., the processor 220) may produce a control command including one of the actions included in the access list within the effective time and the effective count. If the effective time has not elapsed and/or if the number of times the IoT device is controlled does not exceed the effective count, the electronic device 512 (e.g., the processor 220) may produce a control command including one of the actions included in the access list. In an embodiment, if the effective time has elapsed or if the effective count is exceeded, the electronic device 512 (e.g., the processor 220) may output a message indicating that the IoT device is not controllable or deactivate a control menu (e.g., the device control menu 1310 or 1320 shown in FIG. 13) for controlling the IoT device.

In operation 1030, the electronic device 512 (e.g., the processor 220) may transmit a control request message including the produced control command to the hub device 500 through the second secure channel. In operation 1032, the electronic device 512 (e.g., the processor 220) may receive a response message including an execution result in response to the control command from the hub device 500. In operation 1034, the electronic device 512 (e.g., the processor 220) may display the execution result on a display module (e.g., the display module 260).

Figure 11:
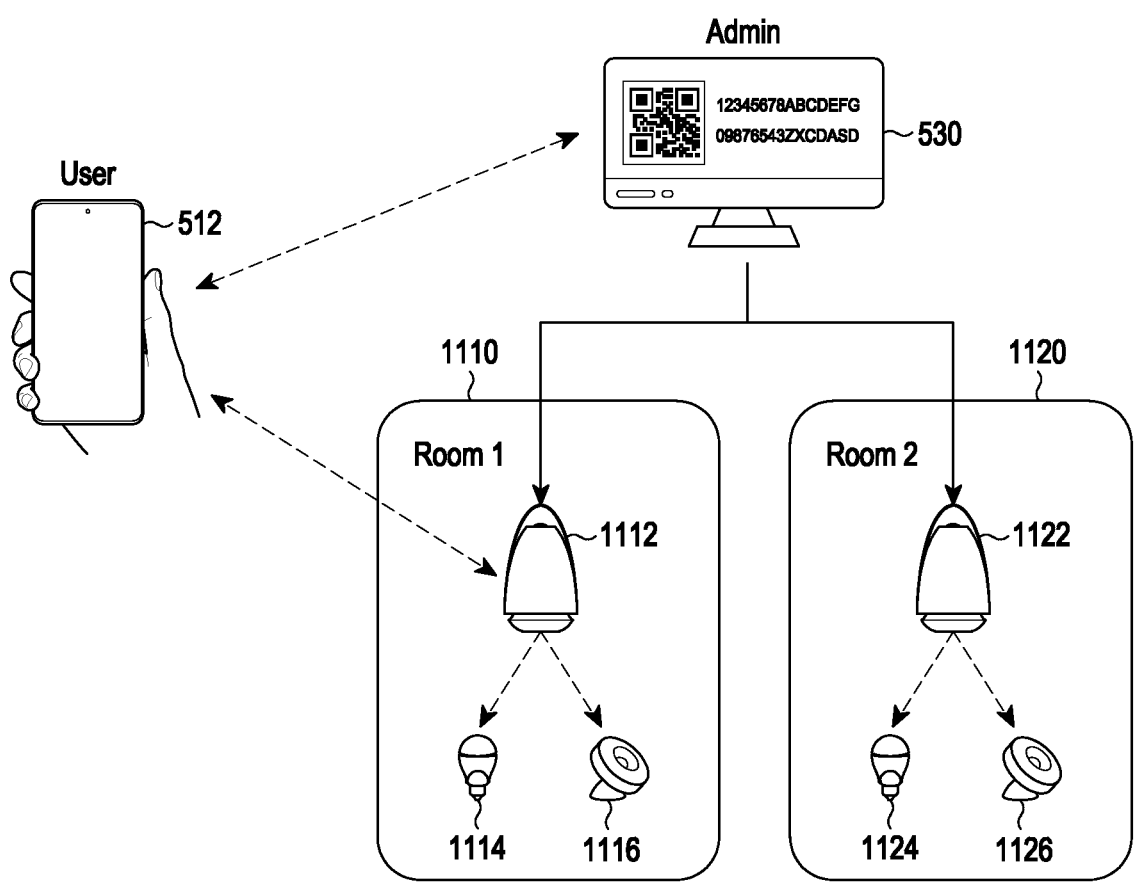
FIG. 11 is a diagram illustrating device control in a hotel scenario according to an embodiment.

FIG. 11 is a diagram illustrating device control in a hotel scenario according to an embodiment.

Referring to FIG. 11, the electronic device 512 may be a smartphone possessed by a guest (e.g., a user) staying at a hotel, and the administrator device 530 may be a smartphone, a PC, a tablet, or TV managed by a hotel network operator, and as an example, a connection code (e.g., a QR code) for a room (e.g., room 1 (1110) or room 2 (1120)) in which the user stays may be displayed on a display. The electronic device 512 may capture the QR code using the camera module 280 to identify the connection code, thereby obtaining at least one of a user ID, connect information, a random PIN, or control information from the connection code. In another embodiment, the electronic device 512 may obtain the connection code through a numeric code or an NFC tag or receive the connection code from the administrator device 530.

In an embodiment, the connect information may include, for example, a MAC address and/or discriminator information of a hub device 1112 (e.g., the hub device 500) inside room 1 (1110) or include MAC and/or discriminator information of a hub device 1122 (e.g., the hub device 500) inside room 2 (1120). In an embodiment, the control information may include, for example, at least one of an effective time, an effective count, or an access list for IoT devices 1114 and 1116 inside room 1 (1110). In an embodiment, the control information may include, for example, at least one of an effective time, an effective count, or an access list for IoT devices 1124 and 1126 inside room 2 (1120).

In an embodiment, the hub device 1112 may manage registration information of the IoT devices 1114 and 1116 inside room 1 (1110), and the hub device 1122 may manage registration information of the IoT devices 1124 and 1126 inside room 2 (1120).

In an embodiment, the electronic device 512 may connect with the hub device 1112 using the connect information of room 1 (1110) and transmit a control command for at least one selected from the IoT devices 1114 and 1116 inside room 1 (1110) to the hub device 1112 using the control information of room 1 (1110). The hub device 1112 may connect with the electronic device 512 using a user ID and/or a random PIN provided from the administrator device 530 and transmit the control command to at least one of the IoT devices 1114 and 1116.

In an embodiment, the electronic device 512 may connect with the hub device 1122 using the connect information of the room 2 (1120) and transmit a control command for at least one selected from the IoT devices 1124 and 1126 inside room 2 (1120) to the hub device 1122 using the control information of room 2 (1120). The hub device 1122 may connect to the electronic device 512 using a user ID and/or a random PIN provided from the administrator device 530 and transmit the control command to at least one of the IoT devices 1124 and 1126.

In an embodiment, the electronic device 512 may receive an execution result corresponding to the control command from at least one of the hub devices 1112 and 1122 and display the execution result on a display module (e.g., the display module 260). In an embodiment, if the effective time indicated in the control information elapses or if the effective count is exceeded, the electronic device 512 may display a notification notifying that the device control is no longer possible.

Figure 12:
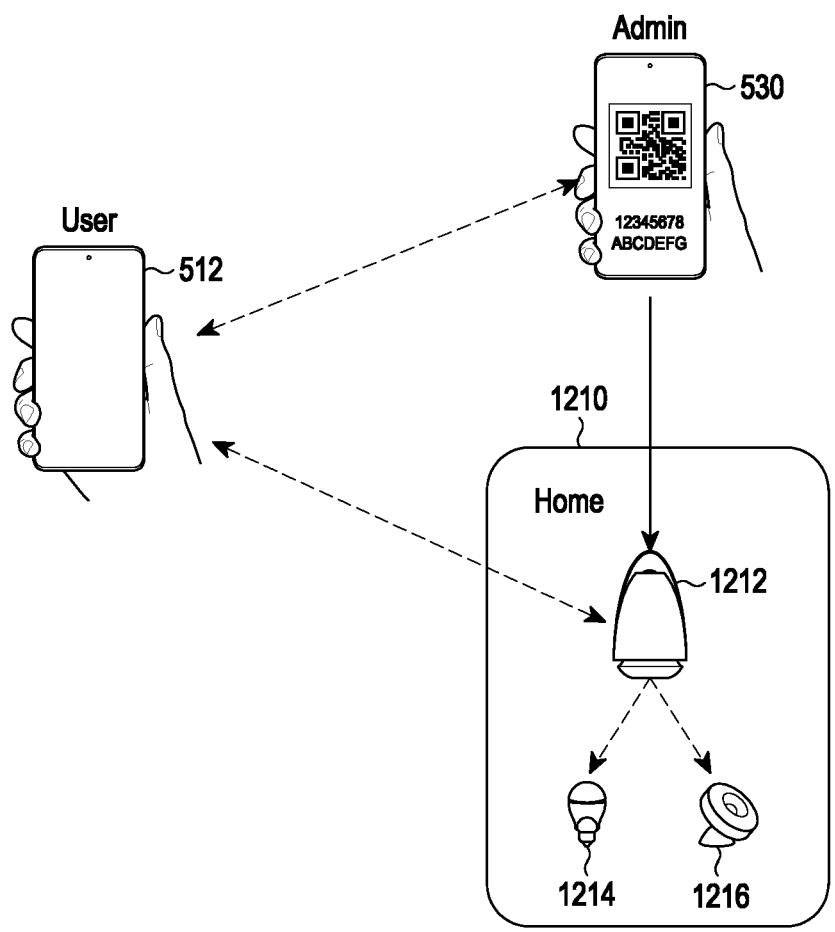
FIG. 12 is a diagram illustrating device control in a home scenario according to an embodiment.

FIG. 12 is a diagram illustrating device control in a home scenario according to an embodiment.

Referring to FIG. 12, the electronic device 512 may be a smartphone possessed by a friend (e.g., a user) visiting home, and the administrator device 530 may be a smartphone, a PC, a tablet, or TV possessed by the owner of the home, and as an example, a connection code (e.g., a QR code) for a home network 1210 may be displayed on a display. The electronic device 512 may capture the QR code using the camera module 280 to identify the connection code, thereby obtaining at least one of a user ID, connect information, a random PIN, or control information from the connection code. In another embodiment, the electronic device 512 may obtain the connection code through a numeric code or an NFC tag or receive the connection code from the administrator device 530.

In an embodiment, the connect information may include a MAC address and/or discriminator information of a hub device 1212 (e.g., the hub device 500) in the home network 1210. In an embodiment, the control information may include, for example, at least one of an effective time, an effective count, or an access list for IoT devices 1214 and 1216 in the home network 1210. In an embodiment, the hub device 1212 may manage registration information of the IoT devices 1214 and 1216 in the home network 1210.

In an embodiment, the electronic device 512 may connect with the hub device 1212 using the connect information and transmit a control command for at least one selected from the IoT devices 1214 and 1216 to the hub device 1212 using the control information. The hub device 1212 may connect with the electronic device 512 using a user ID and/or a random PIN provided from the administrator device 530 and transmit the control command to at least one selected from the IoT devices 1214 and 1216.

In an embodiment, the electronic device 512 may receive an execution result corresponding to the control command from the hub device 1212 and display the execution result on a display module (e.g., the display module 260). In an embodiment, if the effective time indicated in the control information elapses or if the effective count is exceeded, the electronic device 512 may display a notification notifying that the device control is no longer possible.

Figure 13:
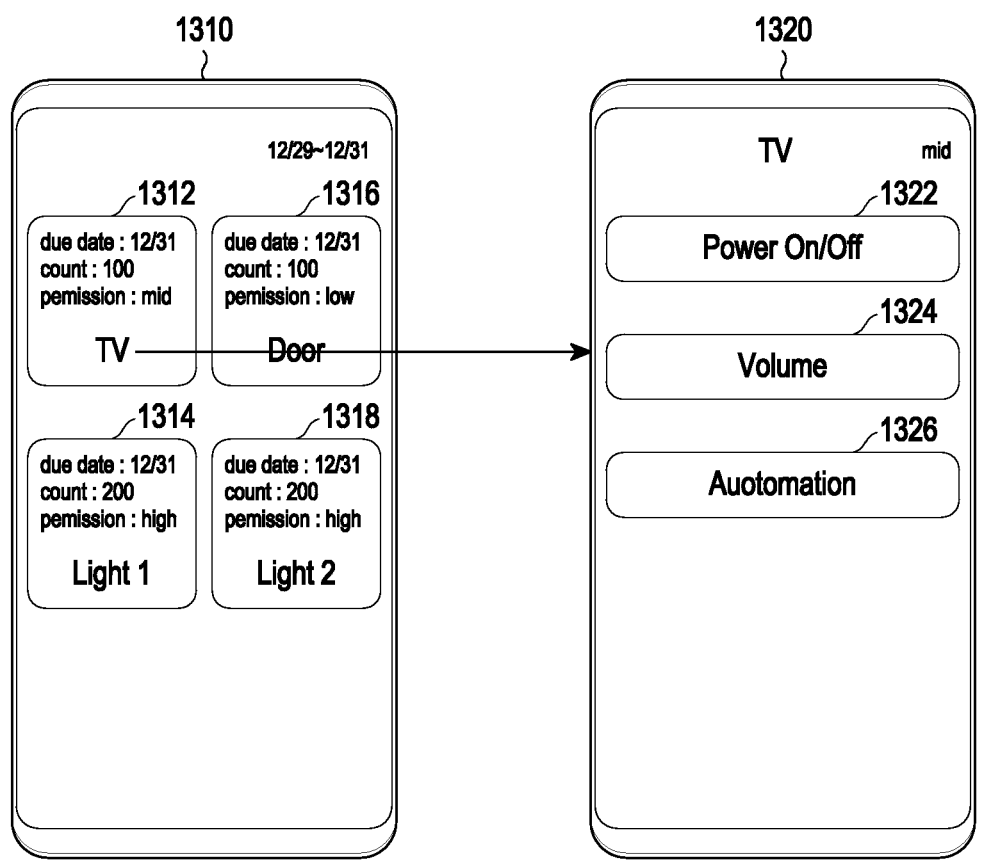
FIG. 13 is a diagram illustrating an example of a user interface for device control according to an embodiment.

FIG. 13 is a diagram illustrating an example of a user interface for device control according to an embodiment.

Referring to FIG. 13, an electronic device (e.g., the electronic device 512) may establish a secure connection (e.g., the second secure channel) with a hub device (e.g., the hub device 500). The electronic device 512 may display a device control menu 1310 on a display module (e.g., the display module 260), based on control information included in the connection code.

In an embodiment, the device control menu 1310 may include input areas 1312, 1316, 1314, and 1318 for IoT devices of which the temporary control authority is permitted based on the control information, such as TV, a door lock, light 1, and light 2.

As an example, a first input area 1312 for TV may show at least one of an effective time (e.g., "due data: 12/31") capable of controlling TV, an effective count (e.g., "count: 100"), or a permission level (e.g., "permission: mid") corresponding to an access list. As an example, a second input area 1316 for a door lock may show at least one of an effective time (e.g., "due data: 12/31") capable of controlling the door lock, an effective count (e.g., "count: 100"), or a permission level (e.g., "permission: low") corresponding to an access list. As an example, third and fourth input areas 1314 and 1318 for lights 1 and 2 may show at least one of an effective time (e.g., "due data: 12/31") capable of controlling the lights 1 and 2, an effective count (e.g., "count: 100"), or a permission level (e.g., "permission: high") corresponding to an access list.

As an example, the first input area 1312 for TV may show at least one of an effective time (e.g., "due data: 12/31") for TV, an effective count (e.g., "count: 100"), or a permission level (e.g., "permission: mid") corresponding to an access list. If a user input is detected on the first input area 1312, the electronic device 512 may display a first device control menu 1320 for TV on the display module (e.g., the display module 260). The first device control menu 1320 may include at least one of the actions corresponding to the permission level "mid" for the TV, for example, a selection item 1322 for power-on/off, a selection item 1324 for volume control, or a selection item 1326 for automation. In an embodiment, based on control information of the electronic device 512 for the TV, a non-controllable selection item (e.g., the selection item 1326) may be deactivated, and the deactivated selection item may not be selected by the user.

In an embodiment, the electronic device 512 may receive a user input requesting execution of a specific action for the TV through at least one of activated selection items 1322 and 1324 and produce a control command corresponding to the user input to transmit the same to the hub device (e.g., the hub device 500).

Figure 14:
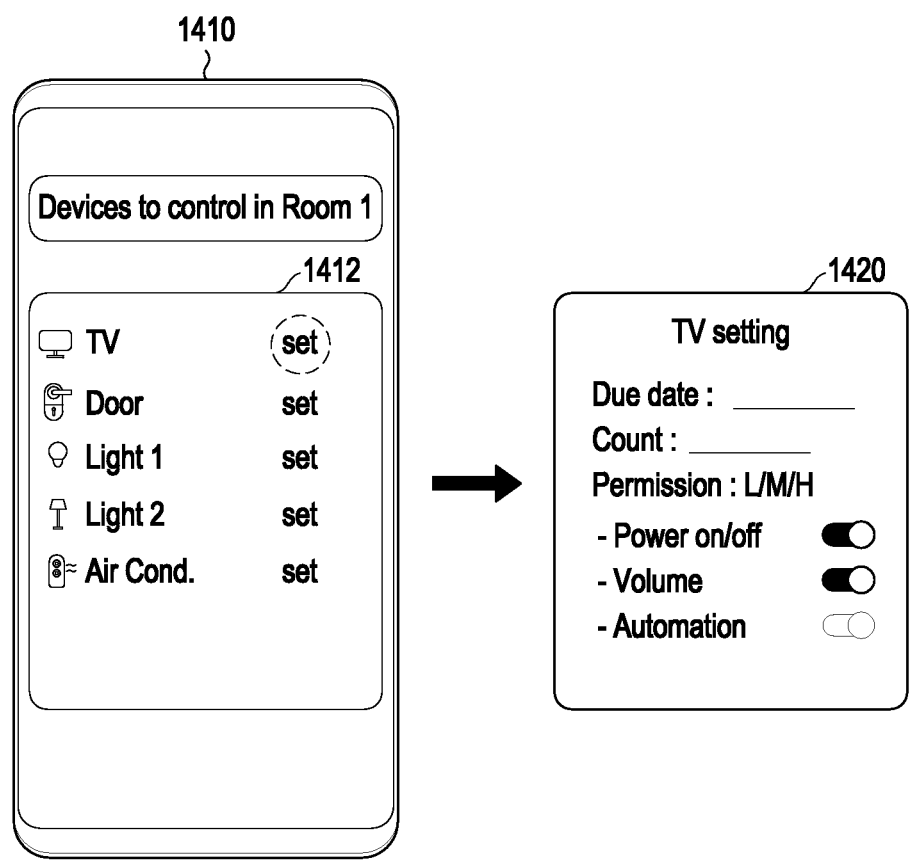
FIG. 14 is a diagram illustrating an example of a user interface for inputting control authority for device control according to an embodiment.

FIG. 14 is a diagram illustrating an example of a user interface for inputting control authority for device control according to an embodiment.

Referring to FIG. 14, an administrator device (e.g., the administrator device 530) may display a configuration menu 1410 enabling configuration of control authority over IoT devices on a display. As an example, the administrator device 530 may obtain a user ID of the electronic device 512 in operation 612 in FIG. 6 or in operation 912 in FIG. 9 and display a configuration menu 1410 to receive an input for configuring control authority permissible to the user ID from the user (e.g., the operator of the administrator device 530).

In an embodiment, the configuration menu 1410 may include a list of controllable devices in a space (e.g., a home network or room 1 in the hotel network) where IoT devices to be controlled are located. As an example, the configuration menu 1410 may include TV, a door lock, light 1, light 2, and an air conditioner in room 1 of the hotel network. If a user input for selecting the TV is received, the administrator device 530 may display a TV configuration menu 1420.

In an embodiment, the TV configuration menu 1420 may include at least one of a first input item ("Due data") for configuring an effective time for which the electronic device 512 is permitted to control the TV, a second input item ("Count") for configuring an effective count in which the electronic device 512 is able to control the TV, or a third input item ("Permission: L/M/H") for configuring a permission level corresponding to actions of the TV capable of being controlled by the electronic device 512. In an embodiment, the TV configuration menu 1420 may further include additional input items for selecting the actions of the TV (e.g., power-on/off, volume, or automation) according to the permission level (e.g., low, middle, or high) configured through the third input item.

In an embodiment, the administrator device 530 may configure temporary control authority over IoT devices in Room 1 for the electronic device 512 through a configuration menu 1410 and a detailed configuration menu (e.g., the TV configuration menu 1420) and produce control information according to the configuration. The control information may be provided to the hub device 500, for example, in operation 616. As an example, the control information may be provided to the electronic device 512 using the connection code in operation 620.

An electronic device for controlling an IoT device according to various embodiments of the disclosure and an operation method thereof may grant control authority over IoT devices to a visitor's electronic device.

An electronic device for controlling an IoT device according to various embodiments may control IoT devices without an onboarding procedure to a network when temporarily controlling the IoT devices is desired.

An electronic device for controlling an IoT device according to various embodiments may easily obtain control authority over IoT devices using a connection code including user information.

An electronic device 512 according to various embodiments may include a communication circuit 290 and at least one processor 220. The at least one processor may be configured to obtain a connection code related to an external electronic device 500 through the communication circuit. The at least one processor may be configured to discover the external electronic device through the communication circuit based on the connection code. The at least one processor may be configured to establish a first secure channel with the external electronic device, based on the connection code, through the communication circuit. The at least one processor may be configured to transmit a control command for at least one internet-of-things (IoT) device to perform a designated action to the external electronic device through the first secure channel using the connection code.

In an embodiment, the connection code may include at least one selected from a user ID, connect information for connection with the external electronic device, random personal identification information (e.g., random PIN) for connection with the external electronic device, or control information indicating control authority over the at least one IoT device.

In an embodiment, the at least one processor may be configured to obtain discriminator information, and a MAC address and a random personal identification number (PIN) of the external electronic device using the connection code, discover the external electronic device through the communication circuit using the discriminator information, establish a second secure channel with the external electronic device using the MAC address, receive a temporary certificate from the external electronic device through the second secure channel, and establish the first secure channel with the external electronic device using the temporary certificate.

In an embodiment, the random PIN may include a designated effective time.

In an embodiment, the at least one processor may be configured to obtain the connection code from at least one selected from a QR code, a numeric code, or an NFC tag, which includes the connection code.

In an embodiment, the at least one processor may be configured to obtain a user ID using the connection code, determine whether or not the obtained user ID matches a user ID of the electronic device, and if the obtained user ID and the user ID of the electronic device match each other, determine to connect the electronic device to the external electronic device.

In an embodiment, the at least one processor may be configured to obtain control information indicating control authority related to the at least one IoT device using the connection code and produce the control command using the control information.

In an embodiment, the control information may include at least one selected from an effective time permitted to control the at least one IoT device, an effective count indicating the number of times the at least one IoT device is able to be controlled, or an access list comprising an action of the at least one IoT device controllable by the electronic device.

In an embodiment, the processor may be configured to display, on a display module, a user interface including at least one selected from the effective time, the effective count, and the access list, based on the control information.

In an embodiment, the at least one processor may be configured to produce the control command including one of the actions included in the access list if the effective time does not elapse and if the number of times the IoT device is controlled does not exceed the effective count.

A method of operating an electronic device 512 according to various embodiments may include an operation 1014 of obtaining a connection code related to an external electronic device. The method may include an operation 1020 of discovering the external electronic device, based on the connection code. The method may include an operation 1026 of establishing a first secure channel with the external electronic device, based on the connection code. The method may include an operation 1030 of transmitting a control command for at least one internet-of-things (IoT) device to perform a designated action to the external electronic device through the first secure channel using the connection code.

In an embodiment, the connection code may include at least one selected from a user ID, connect information for connection with the external electronic device, random personal identification information (e.g., random PIN) for connection with the external electronic device, or control information indicating control authority over the at least one IoT device.

In an embodiment, the operation of discovering the external electronic device may include an operation 1014 of obtaining discriminator information, and a media access code (MAC) address and a random personal identification number (PIN) of the external electronic device using the connection code, and an operation 1020 of discovering the external electronic device using the discriminator information, and the operation of establishing the first secure channel may include an operation 1022 of establishing a second secure channel with the external electronic device using the MAC address, an operation 1024 of receiving a temporary certificate from the external electronic device through the second secure channel, and an operation 1026 of establishing the first secure channel with the external electronic device using the temporary certificate.

In an embodiment, the random PIN may include a designated effective time.

In an embodiment, the connection code may be obtained from at least one selected from a QR code, a numeric code, or an NFC tag, which includes the connection code.

In an embodiment, the method may further include an operation 1014 of obtaining a user ID using the connection code, an operation 1016 of determining whether or not the obtained user ID matches a user ID of the electronic device, and an operation of determining to connect the electronic device and the external electronic device if the obtained user ID and the user ID of the electronic device match each other.

In an embodiment, the method may further include an operation 1014 of obtaining control information indicating control authority related to the at least one IoT device using the connection code and an operation 1028 of producing the control command using the control information.

In an embodiment, the control information may include at least one selected from an effective time permitted to control the at least one IoT device, an effective count indicating the number of times the at least one IoT device is able to be controlled, or an access list comprising an action of the at least one IoT device controllable by the electronic device.

In an embodiment, the method may further include an operation of displaying, on a display module, a user interface comprising at least one selected from the effective time, the effective count, or the access list, based on the control information.

In an embodiment, the operation of producing the control command may include an operation of producing the control command including one of the actions included in the access list if the effective time does not elapse and if the number of times the IoT device is controlled does not exceed the effective count.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", "at least one selected from A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   memory;
   communication circuitry; and
   at least one processor,
   wherein the memory stores instructions configured to, when executed by the at least one processor, cause the electronic device to:
   obtain a connection code related to a first external electronic device, wherein the connection code includes a random PIN (personal identification number) generated by a second external electronic device, wherein the random PIN comprises a designated effective time, wherein the designated effective time is a duration of time that the electronic device is granted to establish a secure channel with the external electronic device,
   obtain discriminator information of the external electronic device and a media access code (MAC) address, included in the connection code,
   discover the external electronic device through the communication circuitry using the discriminator information,
   establish, before the designated effective time does not expire, a first secure channel with the external electronic device, based on the random PIN and the MAC address, through the communication circuitry,
   receive a temporary certificate from the external electronic device through the first secure channel,
   establish a second secure channel with the external electronic device using the temporary certificate, and
   transmit a control command for at least one IoT (internet-of-things) device to perform a designated action to the external electronic device through the second secure channel using the connection code.

2. The electronic device of claim 1, wherein the connection code comprises at least one selected from a user identification (ID), connect information for connection with the external electronic device or control information indicating control authority over the IoT device.

3. The electronic device of claim 1, wherein the instructions configured to, when executed by the at least one processor, cause the electronic device to obtain the connection code from at least one selected from a quick response (QR) code, a numeric code, or a near-field communication (NFC) tag, which includes the connection code.

4. The electronic device of claim 1, wherein the instructions, when executed by the at least one processor, cause the electronic device to
   obtain a user identification (ID) using the connection code,
   determine whether or not the obtained user ID matches a user ID of the electronic device, and
   based on the obtained user ID and the user ID of the electronic device matching each other, determine to connect the electronic device and the external electronic device.

5. The electronic device of claim 1, wherein the instructions, when executed by the at least one processor, cause the electronic device to
   obtain control information indicating control authority related to the at least one IoT device using the connection code, and
   produce the control command using the control information.

6. The electronic device of claim 5, wherein the control information comprises at least one selected from an effective time permitted to control the at least one IoT device, an effective count indicating the number of times the at least one IoT device is able to be controlled, or an access list comprising an action of the at least one IoT device controllable by the electronic device.

7. The electronic device of claim 6, wherein the instructions, when executed by the at least one processor, cause the electronic device to display, on a display module, a user interface comprising at least one selected from the effective time, the effective count, or the access list, based on the control information.

8. The electronic device of claim 6, wherein the instructions, when executed by the at least one processor, cause the electronic device to produce the control command comprising one of the actions included in the access list if the effective time does not elapse and if the number of times the IoT device is controlled does not exceed the effective count.

9. A method of operating an electronic device, the method comprising:
   obtaining a connection code related to an external electronic device, wherein the connection code includes a random PIN (personal identification number) of the external electronic device, and the random PIN comprises a designated effective time, wherein the designated effective time is a duration of time that the electronic device is granted to establish a secure channel with the external electronic device;
   obtaining discriminator information of the external electronic device and a media access code (MAC) address, included in the connection code;
   discovering the external electronic device through the communication circuitry using the discriminator information;
   establishing, before the designated effective time does not expire, a first secure channel with the external electronic device, based on the random PIN and the MAC address;
   receiving a temporary certificate from the external electronic device through the first secure channel;
   establishing a second secure channel with the external electronic device using the temporary certificate; and
   transmitting a control command for at least one IoT (internet-of-things) device to perform a designated action to the external electronic device through the second secure channel using the connection code.

10. The method of claim 9, wherein the connection code comprises at least one of selected from a user identification (ID), connect information for connection with the external electronic device, or control information indicating control authority over the at least one IoT device.

11. The method of claim 9, wherein the connection code is obtained from at least one selected from a quick response (QR) code, a numeric code, or a near-field communication (NFC) tag, which includes the connection code.

12. The method of claim 9, further comprising: obtaining a user ID using the connection code; determining whether or not the obtained user ID matches a user ID of the electronic device; and based on the obtained user ID and the user ID of the electronic device matching each other, determining to connect the electronic device and the external electronic device to each other.

13. The method of claim 9, further comprising:
obtaining control information indicating control authority related to the at least one IoT device using the connection code; and
producing the control command using the control information.

14. The method of claim 13, wherein the control information comprises at least one of selected from an effective time permitted to control the at least one IoT device, an effective count indicating the number of times the at least one IoT device is able to be controlled, or an access list comprising a function of the at least one IoT device controllable by the electronic device.

15. The method of claim 14, further comprising:
displaying, on a display module, a user interface comprising at least one of selected from the effective time, the effective count, or the access list, based on the control information.

16. The method of claim 14, the producing of the control command comprises producing the control command comprising one of the functions included in the access list if the effective time does not elapse and if the number of times the IoT device is controlled does not exceed the effective count.

17. A non-transitory computer-readable recording medium storing one or more programs, the one or more programs comprising instructions that, when executed by at least one processor of an electronic device, cause the electronic device to:
obtain a connection code related to an external electronic device, wherein the connection code includes a random PIN (personal identification number) of the external electronic device, wherein the random PIN comprises a designated effective time, wherein the designated effective time is a duration of time that the electronic device is granted to establish a secure channel with the external electronic device,
obtain discriminator information of the external electronic device and a media access code (MAC) address, included in the connection code,
discover the external electronic device through the communication circuitry using the discriminator information,
establish, before the designated effective time does not expire, a first secure channel with the external electronic device based on the random PIN and the MAC address, through the communication circuitry,
receive a temporary certificate from the external electronic device through the first secure channel,
establish a second secure channel with the external electronic device using the temporary certificate, and
transmit a control command for at least one IoT (internet-of-things) device to perform a designated action to the external electronic device through the second secure channel using the connection code.

* * * * *